(12) United States Patent
Waters

(10) Patent No.: US 12,528,581 B2
(45) Date of Patent: Jan. 20, 2026

(54) SYSTEMS AND METHODS OF ELECTRICALLY POWERING DEVICES

(71) Applicant: WiBotic Inc., Seattle, WA (US)

(72) Inventor: Benjamin Waters, Kirkland, WA (US)

(73) Assignee: WiBotic Inc., Seattle, WA (US)

( * ) Notice: Subject to any disclaimer, the term of this patent is extended or adjusted under 35 U.S.C. 154(b) by 0 days.

(21) Appl. No.: 18/490,563

(22) Filed: Oct. 19, 2023

(65) Prior Publication Data

US 2024/0182169 A1 Jun. 6, 2024

Related U.S. Application Data

(63) Continuation of application No. 17/654,297, filed on Mar. 10, 2022, now Pat. No. 11,827,353, which is a
(Continued)

(51) Int. Cl.
| | |
|---|---|
| *H02J 7/00* | (2006.01) |
| *B60L 53/124* | (2019.01) |
| *B60L 53/126* | (2019.01) |
| *B60L 53/36* | (2019.01) |
| *B60L 53/38* | (2019.01) |
| *B64C 39/02* | (2023.01) |
| *B64U 50/19* | (2023.01) |
| *B64U 50/38* | (2023.01) |
| *H02J 50/10* | (2016.01) |
| *H02J 50/80* | (2016.01) |

(Continued)

(52) U.S. Cl.
CPC .......... *B64C 39/024* (2013.01); *B60L 53/124* (2019.02); *B60L 53/126* (2019.02); *B60L 53/36* (2019.02); *B60L 53/38* (2019.02); *B64U 50/19* (2023.01); *B64U 50/38* (2023.01); *H02J 7/0048* (2020.01); *H02J 50/10* (2016.02); *H02J 50/80* (2016.02); *H02J 50/90* (2016.02); *B64U 10/10* (2023.01); *B64U 10/13* (2023.01); *B64U 10/14* (2023.01); *H02J 7/00045* (2020.01); *H02J 7/005* (2020.01); *H02J 2310/44* (2020.01)

(58) Field of Classification Search
CPC ....................................................... H02J 7/00
See application file for complete search history.

(56) References Cited

U.S. PATENT DOCUMENTS

| | | | |
|---|---|---|---|
| 4,455,523 | A | 6/1984 | Koenck |
| 5,304,916 | A | 4/1994 | Le et al. |

(Continued)

FOREIGN PATENT DOCUMENTS

| | | |
|---|---|---|
| WO | WO 2013/177205 | 11/2013 |
| WO | WO 2016/019159 | 2/2016 |
| WO | WO 2017/147091 | 8/2017 |

OTHER PUBLICATIONS

International Search Report and Written Opinion for PCT/US2017/018766, dated Jun. 9, 2017.

*Primary Examiner* — Robert Grant
(74) *Attorney, Agent, or Firm* — Knobbe, Martens, Olson & Bear, LLP

(57) ABSTRACT

A smart battery includes a battery and a measurement module coupled to measure electrical characteristics of the battery. The smart battery also includes processing logic and a communication interface configured to receive the electrical characteristics and transmit the electrical characteristics to a receiver.

22 Claims, 15 Drawing Sheets

Related U.S. Application Data continuation of application No. 16/847,219, filed on Apr. 13, 2020, now Pat. No. 11,273,913, which is a continuation of application No. 15/438,718, filed on Feb. 21, 2017, now Pat. No. 10,618,651.

(60) Provisional application No. 62/298,377, filed on Feb. 22, 2016.

(51) Int. Cl.
*H02J 50/90* (2016.01)
*B64U 10/10* (2023.01)
*B64U 10/13* (2023.01)
*B64U 10/14* (2023.01)

(56) References Cited

U.S. PATENT DOCUMENTS

| | | | |
|---|---|---|---|
| 5,572,110 A * | 11/1996 | Dunstan | H02J 7/00047 320/150 |
| 8,511,606 B1 | 8/2013 | Lutke et al. | |
| 9,087,451 B1 | 7/2015 | Jarrell | |
| 9,178,369 B2 | 11/2015 | Partovi | |
| 9,573,701 B2 | 2/2017 | Beardsley et al. | |
| 10,099,561 B1 | 10/2018 | Ananthanarayanan et al. | |
| 10,141,770 B2 | 11/2018 | Partovi | |
| 10,178,535 B2 | 1/2019 | Huber et al. | |
| 10,287,034 B2 | 5/2019 | Mozer | |
| 10,618,651 B2 | 4/2020 | Waters | |
| 10,858,097 B2 | 12/2020 | Waters | |
| 11,273,913 B2 | 3/2022 | Waters | |
| 12,252,249 B2 | 3/2025 | Waters | |
| 2005/0127868 A1 | 6/2005 | Calhoon et al. | |
| 2007/0123303 A1 | 5/2007 | Book et al. | |
| 2011/0221604 A1 | 9/2011 | Johnson | |
| 2012/0160696 A1 | 6/2012 | Cook et al. | |
| 2012/0235636 A1 | 9/2012 | Partovi | |
| 2014/0008976 A1 | 1/2014 | Yebka et al. | |
| 2014/0015328 A1 | 1/2014 | Beaver | |
| 2015/0239365 A1 | 8/2015 | Hyde | |
| 2015/0280444 A1 | 10/2015 | Smith et al. | |
| 2015/0336669 A1 * | 11/2015 | Kantor | B64U 50/35 701/3 |
| 2016/0039541 A1 | 2/2016 | Beardsley et al. | |
| 2017/0240061 A1 | 8/2017 | Waters | |
| 2017/0244270 A1 | 8/2017 | Waters | |
| 2020/0339259 A1 | 10/2020 | Waters | |
| 2021/0188433 A1 | 6/2021 | Waters | |
| 2023/0026928 A1 | 1/2023 | Waters | |
| 2024/0270384 A1 | 8/2024 | Waters | |

* cited by examiner

SYSTEMS AND METHODS OF ELECTRICALLY POWERING DEVICES

CROSS-REFERENCE TO ANY RELATED APPLICATIONS

This application is a continuation of U.S. application Ser. No. 17/654,297, filed Mar. 10, 2022, which is a continuation of U.S. Application Ser. No. 16/847,219, filed Apr. 13, 2020, now U.S. Pat. No. 11,273,913, which is a continuation of U.S. application Ser. No. 15/438,718, filed Feb. 21, 2017, now U.S. Pat. No. 10,618,651, which claims priority to U.S. Provisional Application No. 62/298,377, filed Feb. 22, 2016. The content of each of the above applications is hereby incorporated by reference in its entirety. This application is related to U.S. Application Ser. No. 15/438,723, entitled "Detection and Navigation in Wireless Charging." filed Feb. 21, 2017.

TECHNICAL FIELD

This disclosure relates generally to batteries and charging systems, and in particular to batteries coupled with logic and communication capabilities.

BACKGROUND INFORMATION

Traditionally, devices are electrically powered by wires that are plugged into an electrical power source or batteries that require re-charging. However, requiring wires to receive electrical power constricts the movement of the device and traditional batteries require that a battery of the device be replaced or plugged in when the charge is drained. Batteries that are recharged may have different charge capacities based on the number of times the battery has been recharged and the rate at which the batteries are charged and discharged, for example.

For many devices, providing wired electrical power or requiring plugging in to recharge batteries is problematic for the use of the device. In one illustrative context, un-manned vehicles such as aerial vehicles, land-based mobile robots, and aquatic robots would benefit from more sophisticated systems and methods of electrically powering the un-manned vehicles to enable the un-manned vehicles to have reduced down-time, reduce losses of the un-manned vehicles, and increase deployment efficiencies of the un-manned vehicles. Other devices would also benefit from innovative electrical powering that reduces the time it takes to charge batteries of the devices, increases the usable lifetime of the batteries, automates the charging of the device, or provides information relevant to the use of the device.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
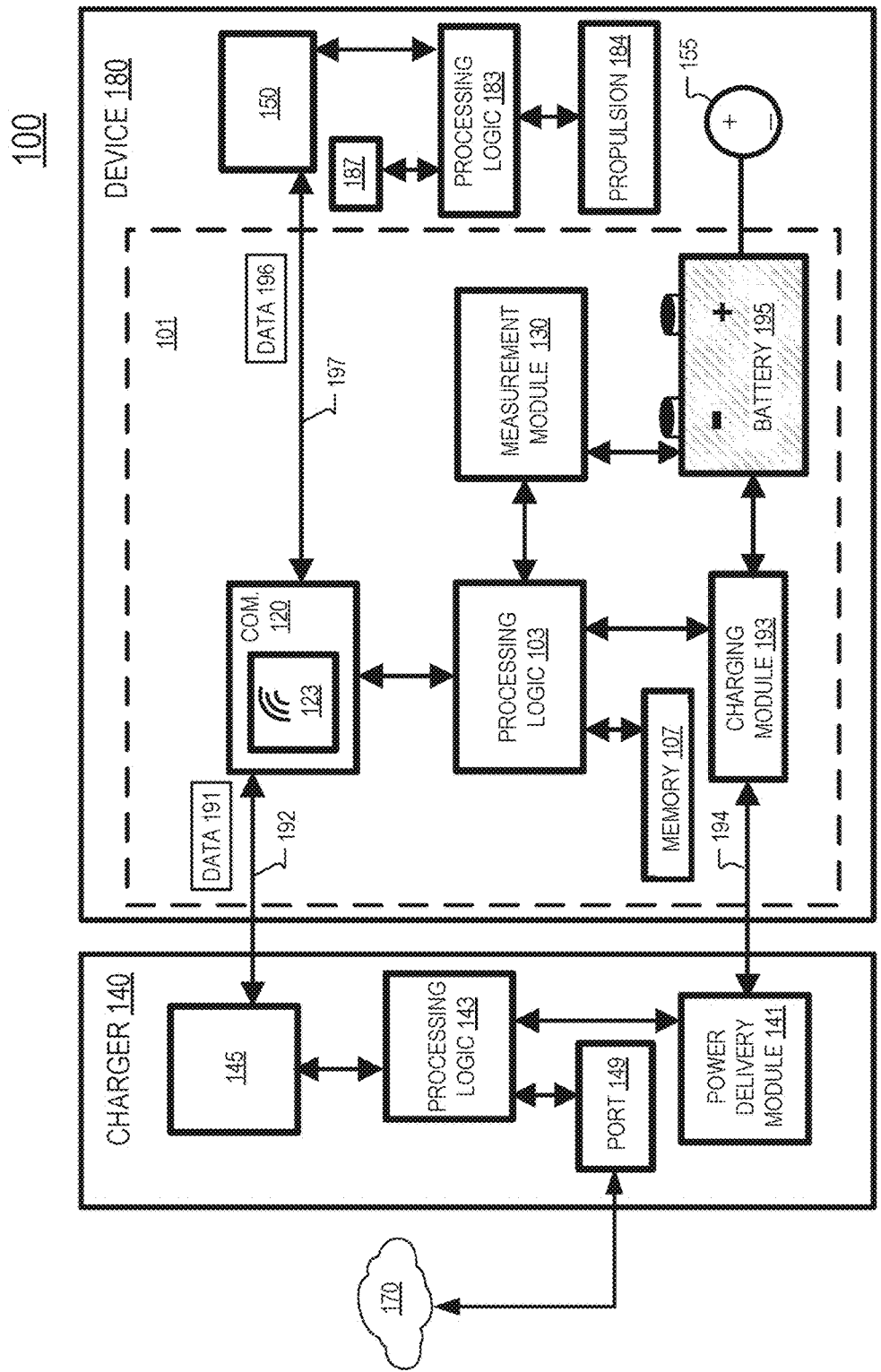
FIG. 1 is an example block diagram system that includes a charger and a device including a smart battery, in accordance with an embodiment of the disclosure.

Embodiments of a system, apparatus, and method of electrically powering devices are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

This disclosure includes examples of electrically charging devices and includes descriptions of smart batteries and systems that include smart batteries. For the purposes of this disclosure, reference to a "smart battery" means a battery that includes logic and communication capabilities. The smart battery is removable from a device that is powered by the smart battery, in some embodiments. In those embodiments, the removable smart batteries have a physical structure that is robust enough (e.g. a plastic enclosure) to be removed from the device and re-installed multiple times as opposed to an integrated or embedded battery that relies on the physical integrity of the device to protect the battery cells. One example of an integrated battery is an iPhone 7 made by Apple of Cupertino, California that relies on the structure of the iPhone 7 to protect the lithium ion battery that powers the iPhone 7.

Conventionally, batteries include very little logic or communication capability. Additionally, conventional batteries rarely include charge circuitry included with the battery. Part of the reason for this is that batteries may be considered a commodity for many applications and adding cost to the battery is not advisable. Another reason that batteries don't typically include charge circuitry, logic, or communication capabilities is because the cost of failure of the battery is not significant enough to warrant the cost of including communication capabilities into the battery. For example, if a battery in a toy fails or needs to be recharged, the toy will not work until new batteries are installed or its battery is recharged, but otherwise the toy is unharmed. Even for more critical applications such as in an automobile or a laptop computer, a failed battery or a battery that needs to be recharged is simply replaced or recharged even when using the vehicle or laptop may be quite critical to a user. Though, here again, the automobile and the laptop generally suffer no harm from a failed or depleted battery. Further reasoning for not including logic and communication capabilities on batteries is that devices may rely on the processing logic and communication capabilities onboard a device to perform any processing and communication related to the battery.

Furthermore, although relying on logic and communication capabilities onboard the device that is powered by a battery may be cost effective, the onboard logic will have limited abilities to measure electrical characteristics of the battery and any data collected from the battery (e.g. electrical characteristics) and any measured electrical characteristics will reside with the processing logic (and memory) of the device rather than the battery. Hence, when a conventional battery is removed from the device, the historical data of the battery will be lost and be unknown by other devices that are powered by the battery when the battery is transferred to another device.

However, integrating logic and/or communications abilities within a battery can be advantageous in a variety of contexts. In one context, high-value devices that use the battery may suffer damage or even complete loss due to the failure or depletion of a battery. In a specific illustrative example, a drone flying when the battery fails or becomes depleted earlier than expected may suffer damage as it falls to earth. In another specific illustrative example, an aquatic robot deployed to the ocean floor that loses power may be lost forever underwater. Thus, in certain contexts, the value of the devices that are powered by batteries are worth thousands of dollars if not millions of dollars. In these contexts, adding features to the battery may be especially beneficial.

Emerging robotic applications that may benefit from the disclosure include aerial, mobile, and aquatic robots. "Drones" are aerial vehicles, typically quad-copters with 4 (or more) electrically driven rotors. Aerial vehicles can also be embodied by fixed-wing unmanned aircraft driven by electrical motors. Conventional drones may typically operate for 10 minutes to 40 minutes before needing to recharge. Mobile robots drive along a surface using one or more electric motors to drive wheels and move the device. Mobile robots are used in many consumer, industrial, medical, retail, defense and security applications today. Aquatic robots drive above or below the surface of water using turbines or buoyancy pumps to propel the device in three-dimensional space. All of these types of robotic devices typically have batteries on the device that need to be recharged.

FIG. 1 is an example block diagram system 100 that includes a charger 140 and a device 180 including a smart battery 101, in accordance with an embodiment of the disclosure.

Charger 140 includes communication element 145 which may be a receiver or a transceiver, processing logic 143, a communication port 149, and power delivery module 141, in the illustrated embodiment. In FIG. 1, processing logic 143 is communicatively coupled to communication element 145, communication port 149, and power delivery module 141. Communication port 149 is illustrated as being communicatively coupled to network 170.

Device 180 includes communication element 150 which may be a receiver or a transceiver, processing logic 183, memory 187, a propulsion mechanism 184, a smart battery 101, and a power source receiver 155, in the illustrated embodiment. In FIG. 1, smart battery 101 includes a communication interface 120 that includes a wireless communication interface 123. In some embodiments, communication interface 120 does not include wireless communication interface 123 and communication interface 120 utilizes wired communication only. Example smart battery 101 also includes processing logic 103, measurement module 130, battery 195, charging module 193, and memory 107, in the illustrated embodiment. In one embodiment, device 180 is an un-manned vehicle such as a drone (e.g. quadcopter with four or more electrically driven motors), land-based robot, or aquatic robot (e.g. submarine) and smart battery 101 powers the un-manned vehicle. Smart battery 101 may be removable from device 101.

In the illustrated example of FIG. 1, power source receiver 155 is coupled to receive power from battery 195. In one embodiment, power source receiver 155 includes metal nodes that are coupled to the positive and negative terminals of battery 195, respectively. Processing logic 183 is communicatively coupled to propulsion mechanism 184, memory 187, and communication element 150, in FIG. 1. In one embodiment, propulsion mechanism 184 includes one or more motors coupled to drive wheels, propellers, tracks or other propulsion means of un-manned vehicles. Receiver 150 is communicatively coupled to receive data 196 from communication interface 120 via communication channel 197 and receiver 145 is communicatively coupled to receive data 191 from communication interface 120 via communication channel 192. Charging module 193 is coupled to receive energy from power delivery module 141 via charge path 194 and coupled to charge battery 195. In one embodiment, charge path 194 is a wireless charge path. In one embodiment, charge path 194 is a wired charge path. Processing logic 103 is communicatively coupled to communication interface 120, measurement module 130, memory 107, and charging module 193, in the illustrated embodiment. In one embodiment, memory 107 is not included in smart battery 101. Where charge path 194 is a wired charge path, charging module 193 may include a power regulator similar to power regulator 235 of FIG. 2 for converting the received wired power to the voltage and/or current conditions for charging battery 195. In one embodiment where charge path 194 is a wired charge path, charging module 193 is not included in smart battery 101 and external charging circuitry is relied upon to properly charge battery 195. In that case, the charging circuitry that would be including in charging module 193 may be included instead in power delivery module 141.

The term "processing logic" (e.g. 103, 143, and/or 183 in FIG. 1) in this disclosure may include one or more processors, microprocessors, multi-core processors, and/or Field Programmable Gate Arrays (FPGAs) to execute operations disclosed herein. In some embodiments, memories (not illustrated) are integrated into the processing logic to store instructions to execute operations and/or store data. Processing logic may include analog or digital circuitry to perform the operations disclosed herein. A "memory" or "memories" (e.g. 107 and/or 187) described in this disclosure may include volatile or non-volatile memory architectures.

Network 170 may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network. Port 149 may communicate with network 170 via wired or wireless communication utilizing Ethernet or wireless communication using IEEE 802.11 protocols, for example.

In FIG. 1, communication channels 192 and 197 may include wired or wireless communications utilizing IEEE 802.11 protocols, BlueTooth, SPI (Serial Peripheral Interface), I2C (Inter-Integrated Circuit), USB (Universal Serial Port), CAN (Controller Area Network), or otherwise.

Battery 195 in FIG. 1 may include multiple battery cells. In one example, battery 195 includes six battery cells. Battery 195 may include lithium-ion, nickel cadmium, or other battery chemistry. In one embodiment, processing logic 103 receives battery chemistry data via communication interface 120 that indicates the battery chemistry and/or architecture of the battery 195. Processing logic 103 may store the battery chemistry data 103 in memory 107.

Measurement module 130 is coupled to measure electrical characteristics of battery 195. In one embodiment, measurement module 130 measures a battery voltage of battery 195. In one embodiment, measurement module 130 is configured to measure a battery current provided by the battery (discharge current) or supplied to the battery (charge current). Measuring the discharge current or charge current may include measuring a voltage across a current sense resistor (e.g. 1 milliohm value) that is coupled in series with a positive terminal of the battery 195. In one embodiment, measurement module 130 is configured to measure the voltage of each battery cell of battery 195 from nodes of each battery cell. In one embodiment, measurement module 130 is coupled to receive measurements from one or more temperature sensors that are positioned within the battery.

In one embodiment, an internal resistance of the battery may be calculated by measuring the battery voltage and current over time. In a specific illustrative embodiment, the current flowing through the battery and the voltage drop across each battery cell of the battery is measured. Hence, the internal resistance of each battery cell can be calculated by:

$$\text{Internal Resistance} = (V2 - V1)/I \qquad \text{(Equation 1)}$$

where V2 is the voltage where the current enters the battery cell (the higher voltage), V1 is the voltage where the current exits the battery cell (the lower voltage), and I represents the current flowing through the battery cell.

In one embodiment, processing logic 103 is configured to cause measurement module 130 to perform electrical measurements to measure electrical characteristics and/or temperature characteristics of battery 195. The processing logic 103 may be configured to store the electrical characteristics and/or temperature characteristics measured by the measurement module 130 to memory 107 or a memory internal to processing logic 103. In one embodiment, memory 107 is not included in smart battery 101 and processing logic 103 is configured to send the electrical characteristics and/or temperature characteristics to communication interface 120 for transmission to receiver 145 for storing the data on a memory (not illustrated) coupled to processing logic 143 onboard the charger 140 or send the data to memory 187 via receiver 150 and processing logic 183. Processing logic 103 may initiate a plurality of electrical measurements of battery 195 over different time periods to generate a time-series data of the electrical characteristics and/or temperature characteristics of battery 195. Time-series data of battery 195 may allow processing logic 103 to calculate an energy capacity value of battery 195. A battery life value of battery 195 may be derived from the energy capacity value of battery 195. Access to this information may allow processing logic 103 to predict a failure of battery 195 or transmit a battery life value that can be informative as to the time that battery 195 can power device 180, as will be discussed below.

In one embodiment, communication interface 120 is coupled to receive device data from device 180 via communication channel 197. The processing logic 103 may receive the device data from the communication interface 120 and store the device data in memory 107. The processing logic 103 may transmit the device data to charger 140 via communication interface 120, which may include transmitting the device data via wireless communication interface 123. In one embodiment, device 180 includes a unique identifier that identifies device 180 and the device data includes the unique identifier. In one embodiment, communication element 150 includes a transceiver for transmitting data to communication interface 120. The unique identifier may be stored in memory 187 and transmitted to smart battery 101 via processing logic 183 and the transceiver of communication element 150. Smart battery 101 may also include a battery unique identifier that identifies the smart battery. In one embodiment, the unique identifier of device 180 and the battery unique identifier of smart battery 101 are sent to charger 140 via communication channel 192 so that charger 140 has access to which smart battery 101 is powering which device 180. Charger 140 may transmit the unique identifier of the device 180 paired with the battery unique identifier of smart battery 101 to network 170 via port 149.

In one embodiment, processing logic 103 is configured to initiate (with measurement module 130) a series of measurements of the electrical characteristics and/or temperature characteristics of the battery 195 over a period of time. For example, measurement module 130 may measure a battery voltage of battery 195 and/or the cell voltage of cells of battery 195. Measurement module 130 may also measure a charge current or discharge current of the battery 195. Measurement module 130 may also read temperature sensors disposed in battery 195. In one embodiment, the measurements are taken every minute. Processing logic 103 may be further configured to store the series of measurements to a memory (e.g. memory 107). In one embodiment, the processing logic 103 further analyzes the series of measurements to determine a number of charge cycles the battery 195 has received over a life time of the battery 195 and the number of charge cycles is transmitted from the communication interface 120 to a receiver (e.g. 145 or 150). In another embodiment, the processing logic 103 further analyzes the series of measurements to determine a remaining battery life value of the battery 195 and the remaining battery life value is transmitted from the communication interface 120 to a receiver (e.g. 145 or 150). In one embodiment, the remaining battery life value is in units of time. In one embodiment, the remaining battery life value is in units of power (e.g. mAh).

Figure 2:
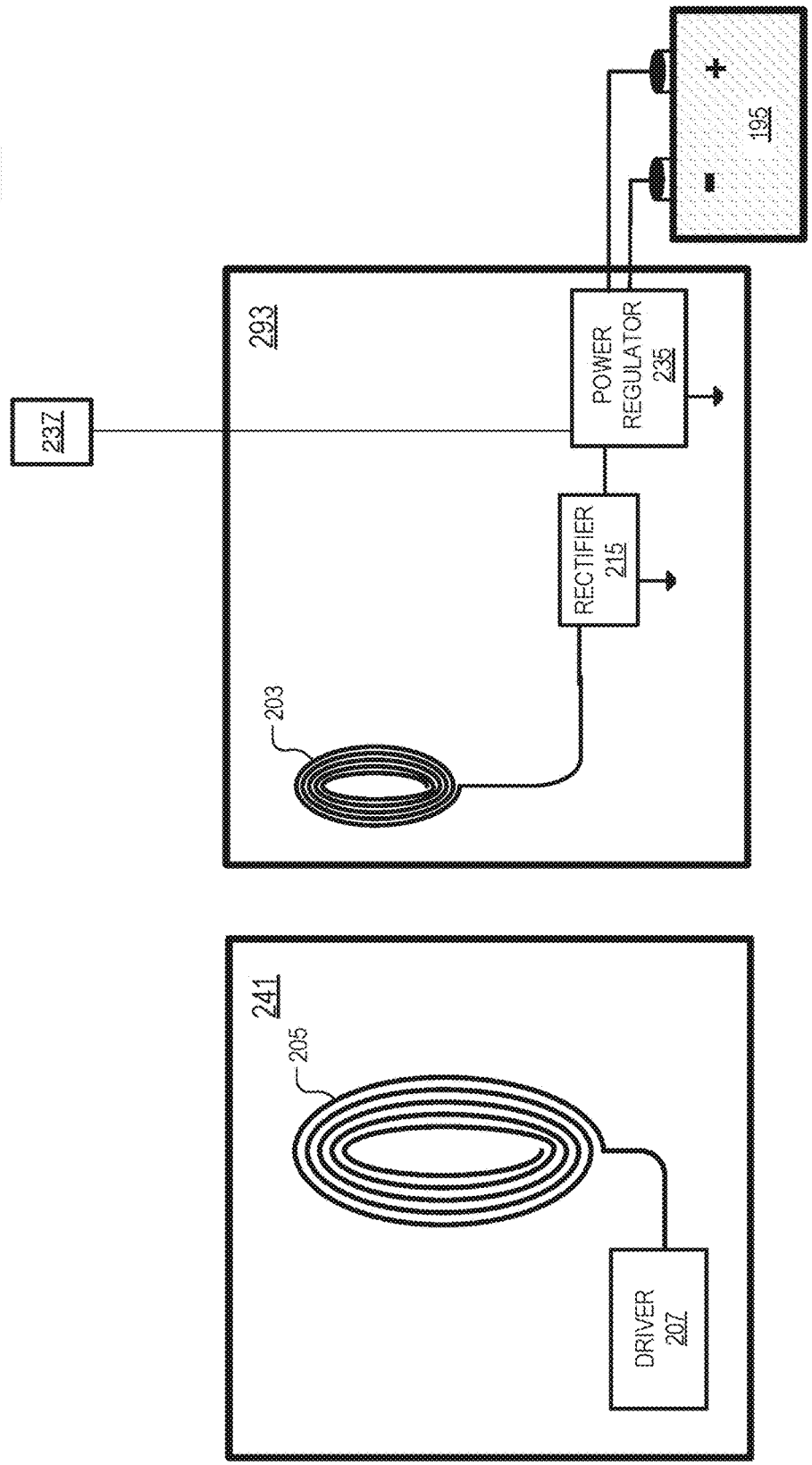
FIG. 2 illustrates an example power delivery module and an example charging module, in accordance with an embodiment of the disclosure.

FIG. 2 illustrates an example power delivery module 241 and an example charging module 293 included in system 200, in accordance with an embodiment of the disclosure. In system 200, power delivery module 241 charges battery 195 by wirelessly transmitting energy (e.g. inductive charging) from transmit charging coil 205 to receive charging coil 203. In the illustrated embodiment, the wireless energy received by receive charging coil 203 is rectified by rectifier 215 and regulated by power regulator 235 to charge battery 195 in the illustrated charging module 293. Rectifier 215 may include a full-wave bridge rectifier and power regulator 235 may include a PMIC (power management integrated circuit) such as a linear regulator, switching power supply, and/or switching regulator. Power delivery module 241 may be included in power delivery module 141 of FIG. 1 and charging module 293 may be included in charging module 193.

In example power delivery module 241, a driver 207 generates an electrical signal to be driven onto transmit charging coil 205 to wirelessly transmit energy to receive charging coil 203. Driver 207 may include a signal generator coupled to a gate driver having an output coupled to an RF (Radio Frequency) amplifier in order to generate the signal to be driven onto transmit charging coil 205.

FIG. 2 also illustrates that in addition to charging module 293 being configured to charge battery 195 by way of receiving wireless energy with receive charge coil 203, charging module 293 may also receive electrical energy from a wired connector or port 237. In the illustrated embodiment, the wired connector 237 is coupled as in input to power regulator 235, although in other embodiments the wired connector 237 could supply wired electrical energy to rectifier 215 or directly to battery 195. Having a charging module 193/293 include both a wired (237) and wireless (203) input gives the flexibility to charge the battery 195 either wirelessly using a wireless version of charger 140 that includes a transmit charging coil 205 or a wired charging option (237).

Figure 3:
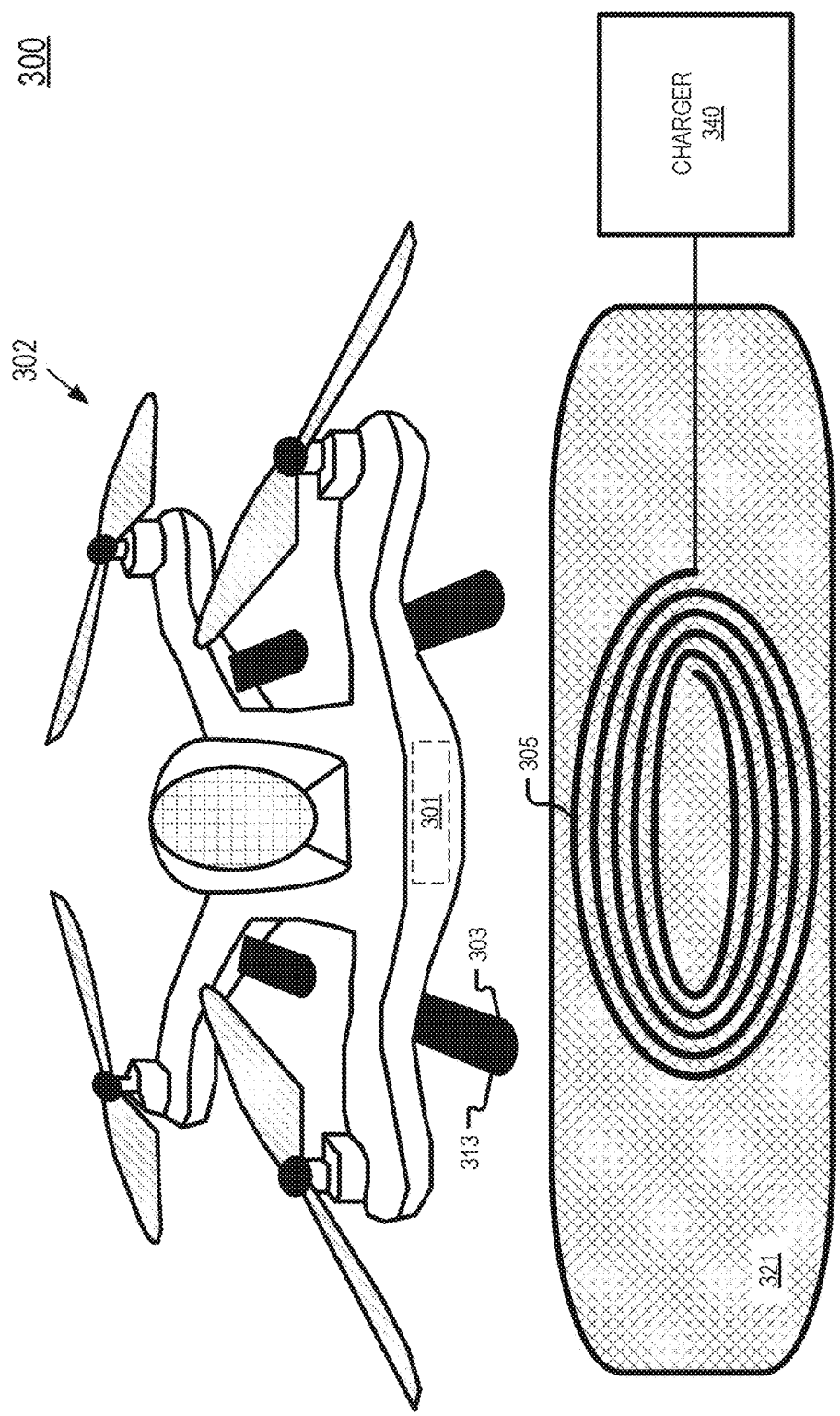
FIG. 3 illustrates an example quadcopter having a receiving charging coil, an example transmit charging coil included in a charging mat, and a charger coupled to drive the transmit charging coil, in accordance with an embodiment of the disclosure.

FIG. 3 illustrates an example quadcopter 302 having a receive charging coil 303, an example transmit charging coil 305 included in a charging mat 321 of system 300, and a charger 340 coupled to drive the transmit charging coil 305, in accordance with an embodiment of the disclosure. Charger 340 may include the components of charger 140. In the illustrated embodiment of FIG. 3, receive charging coil 303 is coiled around, or integrated into, leg 313 of quadcopter 302. In some embodiments, some or all or legs 313 of quadcopter 302 may include coils 313 to facilitate charging of a smart battery 301 that powers quadcopter 302. It is appreciated by those skilled in the art that coils 303 may be disposed somewhat remote from smart battery 301 while still providing the energy to charging module (e.g. 193/293) of smart battery 301 via a wire that transmits the wireless energy from receiving charging coil(s) to the charging module of the smart battery 301. In one embodiment, the receive charging coils are integrated into a removable smart battery 301. For example, wherein smart battery 301 is structurally encased by a plastic material, the receive charging coil may also be within the plastic material that protects a battery 195. When a plurality of receive charge coils 303 are utilized, they may be coupled to the same rectifier (e.g. 215) so that whatever receive charge coil(s) 303 are receiving the wireless energy can deliver the energy to the rectifier.

Figure 4:
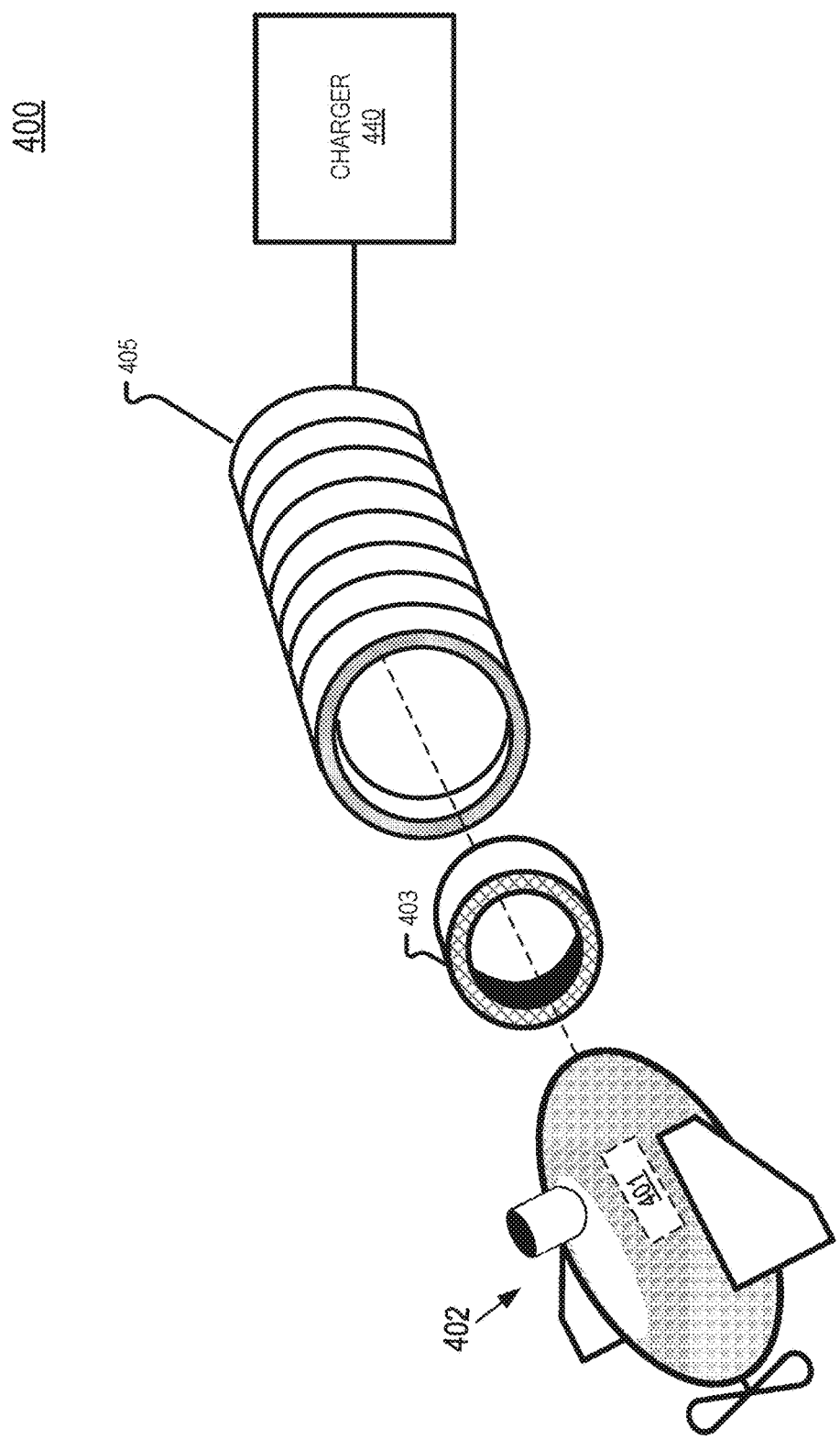
FIG. 4 illustrates an example aquatic robot that includes a receive charging coil configured to receive energy from a transmit charging coil driven by a charger, in accordance with an embodiment of the disclosure.

FIG. 4 illustrates an example aquatic robot 402 that includes a receive charging coil 403 configured to receive energy from a transmit charging coil 405 driven by a charger 440, in accordance with an embodiment of the disclosure. Charger 440 may include the components of charger 140. In the illustrated embodiment of FIG. 4, receive charging coil 403 is illustrated as detached from aquatic robot 402 to show that the receive charging coil 403 is coiled in a cylindrical shape to fit inside of transmit charging coil 405, in some embodiments. However, receive charging coil 403 is affixed to and/or integrated into aquatic robot 402, in practice. All or a portion of aquatic robot 402 may fit into transmit charging coil 405 which is coiled in a cylindrical shape in the illustrated embodiment of system 400. In the illustrated embodiment, receive charging coil 403 is substantially axially aligned with transmit charging coil 405 when the aquatic robot 402 is being wirelessly charged to facilitate more efficient transfer of energy. It is appreciated by those skilled in the art that coil 403 may be disposed somewhat remote from smart battery 401 while still providing the energy to a charging module (e.g. 193/293) of smart battery 401 via a wire that transmits the wireless energy from receiving charging coil(s) to the charging module of the smart battery 401. In one embodiment, the receive charging coils are integrated into a removable smart battery 401. System 400 may be especially advantageous in aquatic environments because waves and currents act on aquatic robot 402 in underwater environments and aquatic robot 402 may experience reduced water current when charging inside of transmit charging coil 405. Shielding the aquatic robot 402 from wave or tidal movements may allow it to spend less energy to stay in a charging position proximate to transmit charging coil 405.

Figure 5:
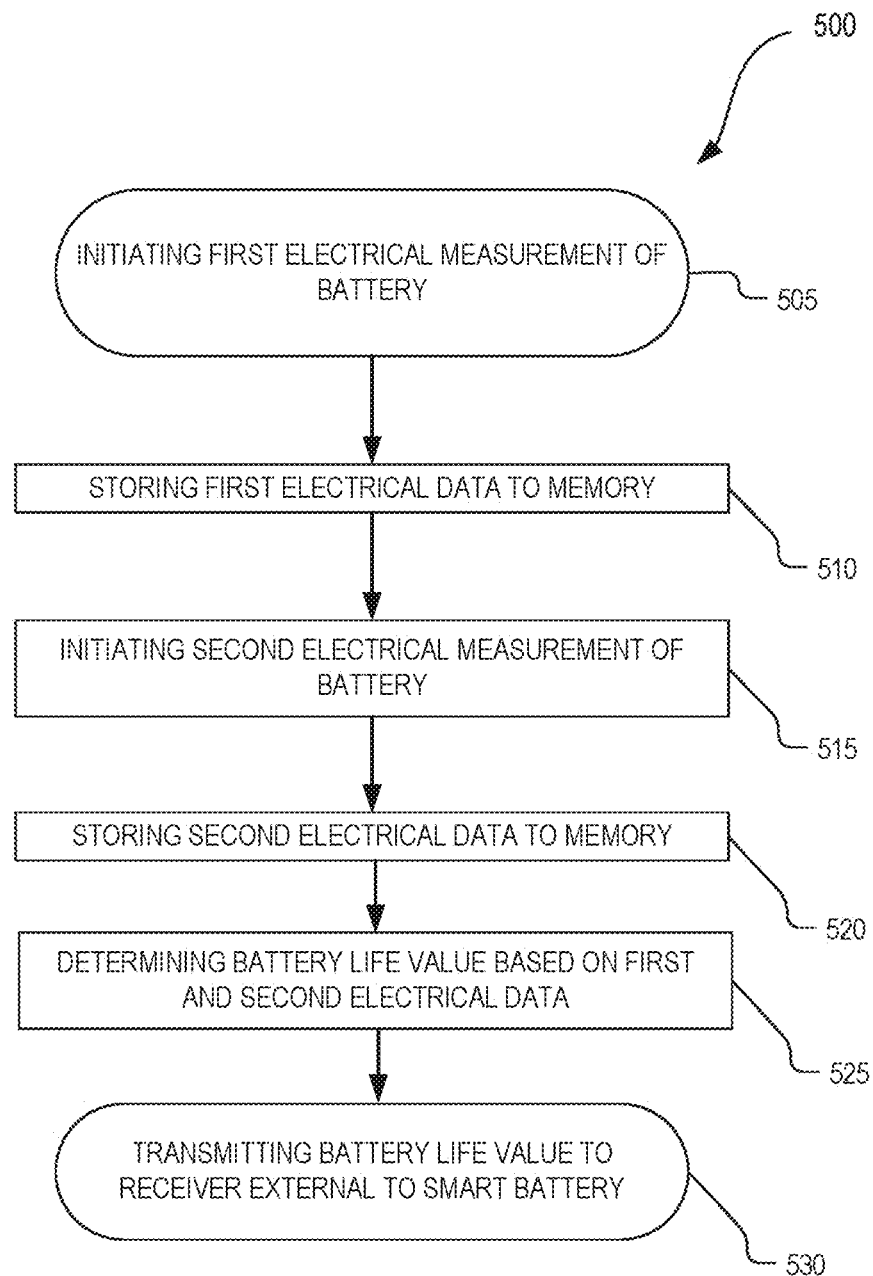
FIG. 5 illustrates a flow chart of an example process of a smart battery determining a battery life value of a battery within the smart battery, in accordance with an embodiment of the disclosure.

FIG. 5 illustrates a flow chart of an example process 500 of a smart battery determining a battery life value of a battery within the smart battery, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In process block 505, a first electrical measurement of a battery at a first time is initiated by processing logic (e.g. 103). The battery and the processing logic are included in the smart battery.

In process block 510, first electrical data representative of the first electrical measurement is stored in a memory included in the smart battery.

In process block 515, a second electrical measurement of a battery at a second time following the first time is initiated by the processing logic.

In process block 520, second electrical data representative of the second electrical measurement is stored in the memory included in the smart battery.

In process block 525, a battery life value is determined with the processing logic of the smart battery. The battery life value is based at least in part on the first and second electrical data. In one embodiment, an energy capacity of the battery is calculated based at least in part on the first and second electrical data and the battery life value is derived from the energy capacity calculation.

In process block 530, the battery life value is transmitted with a communication interface (e.g. 120) of the smart battery to a receiver (e.g. 145 or 150) external to the smart battery.

Transmitting

In some embodiments, thousands of electrical measurements of the battery are taken and determining the battery life value is determined using all or a portion of the electrical measurement data is used to determine the battery life value.

In one illustrative example, charge current measurements and discharge current measurements are taken every second. The battery voltage of the battery may also be taken every second. The energy capacity (e.g. amp-hours) of the battery can be determined by multiplying together the measured current and the time. Units of energy (e.g. watt-hours) is found by multiplying battery voltage by battery current by time. The remaining energy of the battery may be transmitted to the receiver as the "battery life value" in process block 530. In one embodiment, the remaining energy value is converted to an estimated time left that the battery can continue providing energy at the current use rate and the estimated time left is the "battery life value" in process block 530. In one embodiment, the measured energy capacity of the battery is compared to a "rated" energy capacity of the battery that may be specified by a manufacturer. The measured energy capacity may be an energy capacity that is averaged over multiple charge or discharge cycles of the battery. If the determined energy capacity (as measured by measurement module 130) falls below a threshold of the rated energy capacity of the battery, a battery failure warning may be communicated to the receiver. In one embodiment, when the measured energy capacity of the battery falls below 50% of the rated energy capacity of the battery, the battery failure warning is transmitted to the receiver (e.g. 145 or 150)

In one embodiment, the receiver in process block 530 is onboard an un-manned vehicle powered by the battery. In a specific illustrative embodiment, a battery of smart battery 301 powers quadcopter 302 and the battery life value is transmitted from smart battery 301 to a receiver of the quadcopter 302. The battery life value may give the quadcopter an accurate time or power remaining so that the quadcopter can calculate the amount of air-time it has left and return to land on a landing mat (e.g. 321) to be charged by its wireless charger (e.g. charger 340). Although devices often times have logic that can read the battery voltage of a battery, the battery voltage or other simple measurement technique performed by the device may give a less accurate picture of the power or time that the battery has left because of the variance between batteries. The variance between batteries may be attributed to age, charge cycles that the battery has experienced, the environmental conditions (e.g. heat and cold) that the battery has been subject to, and/or the rate of charge/discharge that the battery has undergone. Thus, having the logic (e.g. 103), measurement capabilities (e.g. 130), and memory (e.g. 107) to store electrical measurement data over time gives the smart battery (e.g. 101) better data for predicting the power and/or time that a battery can charge a device.

Furthermore, measurement module 130 of smart battery 101 may have access to more detailed measurements such as the cell voltages, whereas the device may not have access to cell voltages for individual cells. In some examples, a battery may produce an overall battery voltage that is indicative of a healthy battery, yet the cell voltages of one of the cells may indicate that one of the cells of the battery is nearing failure. Hence, the measurement of the battery with the less sophisticated measurement capabilities of a device may green light a device deployment doomed to catastrophic failure and loss of thousand if not millions of dollars in the un-manned vehicle or autonomous vehicle context. In contrast, a disclosed smart battery with the integrated measurement module and logic may measure the same battery and predict a battery cell failure that would prevent a device deployment where the battery ultimately fails during the deployment.

In one embodiment, the receiver in process block 530 is included within a charger (e.g. 140) configured to charge the battery (e.g. 195). In this embodiment, the receiver may pass the battery life value to network 170 (via processing logic 143 and port 149 for example).

Figure 6:
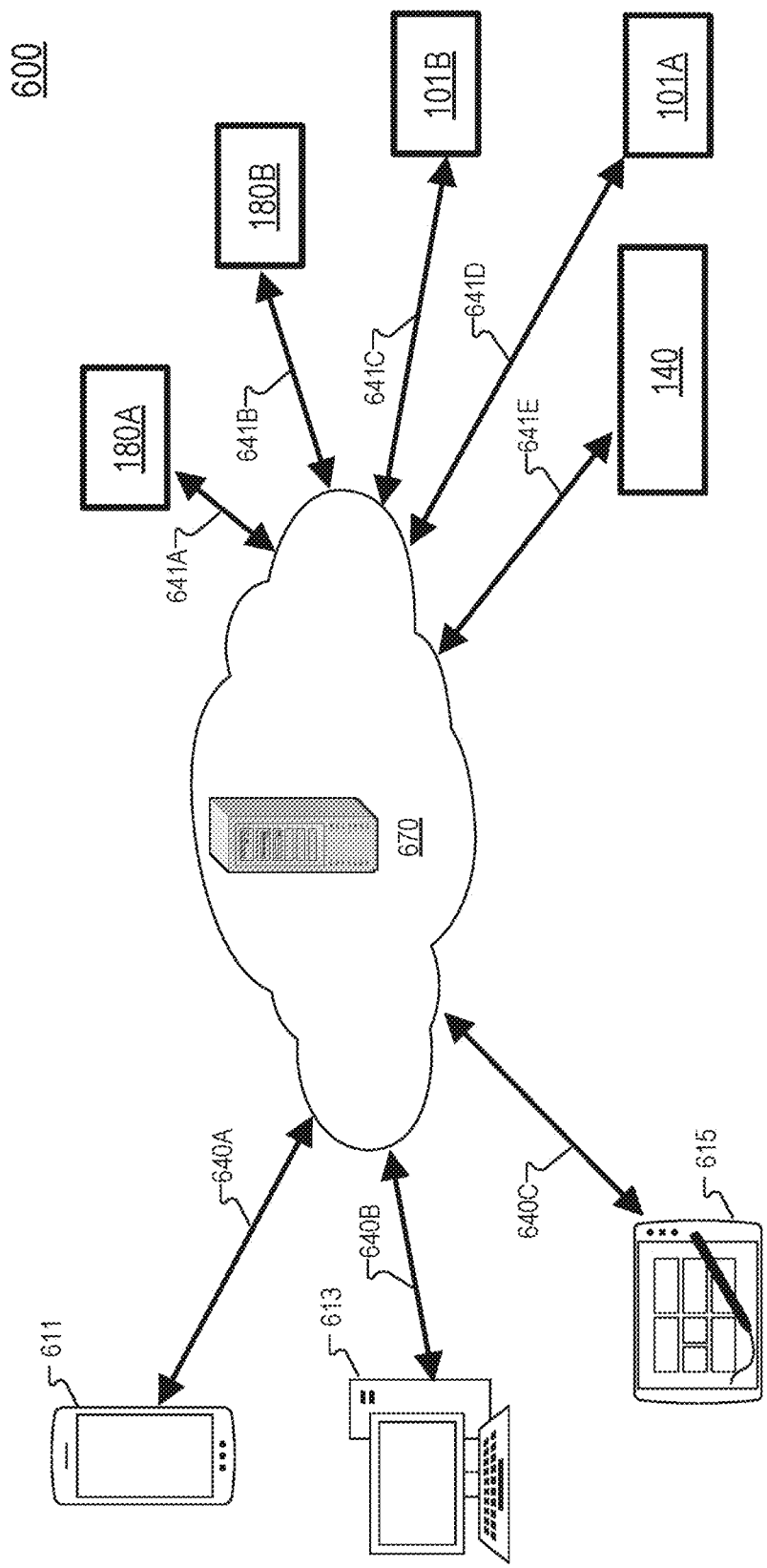
FIG. 6 illustrates an example system including a server that is optionally communicatively coupled with one or more chargers, smart batteries, and devices that include smart batteries, in accordance with an embodiment of the disclosure.

FIG. 6 illustrates an example system 600 including a network 670 that is optionally communicatively coupled with one or more chargers 140, smart batteries 101, and devices 180 that include smart batteries via communication channels 641A, 641B, 641C, 641D, and 641E, respectively, in accordance with an embodiment of the disclosure. Communication channels 641A, 641B, 641C, 641D, and 641E (collectively referred to as 641) may include wired or wired communications utilizing Ethernet, IEEE 802.11 protocols, USB (Universal Serial Port), or otherwise. In FIG. 6, network 670 is also optionally communicatively coupled to mobile phone 611, personal computer 613, and tablet 615 via communication channels 640A, 640B, and 640C, respectively. Communication channels 640A, 640B, and 640C (collectively referred to as 640) may include wired or wired communications utilizing Ethernet, IEEE 802.11 protocols, USB (Universal Serial Port), or otherwise.

In one embodiment, network 670 includes a server computer having a communication interface and processing resources. Network 670 may communicate directly with smart batteries 101 via communication interface 120. Network 670 may communicate directly to charger 140 via port 149, in one embodiment. Network 670 may communicate directly to device 180 via communication element 150. Communication elements 145 and 150 may include a wireless transceiver configured to utilize IEEE 802.11 protocols or cellular data protocols (e.g. 3G, 4G, LTE). Port 149 and wireless communication interface 123 may also include a wireless transceiver configured to utilize IEEE 802.11 protocols or cellular data protocols (e.g. 3G, 4G, LTE).

Figure 7:
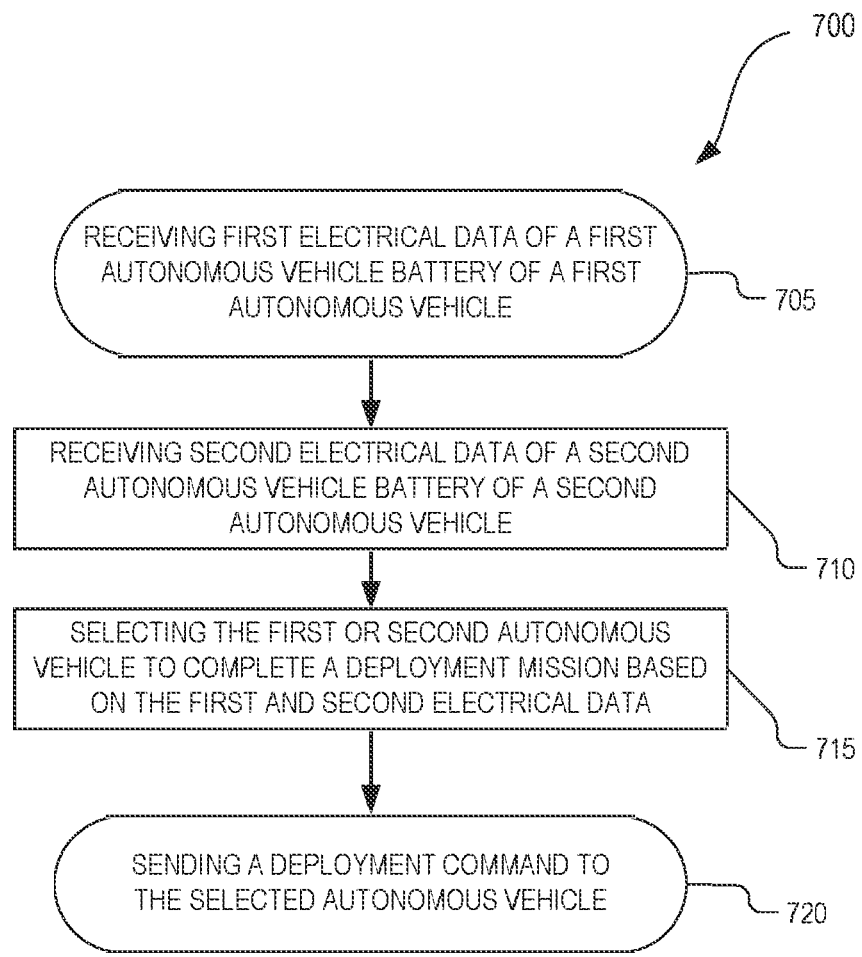
FIG. 7 illustrates a flow chart of an example process of deploying autonomous vehicles based on electrical characteristics of the batteries of the autonomous vehicles, in accordance with an embodiment of the disclosure.

FIG. 7 illustrates a flow chart of an example process 700 of deploying autonomous vehicles based on electrical characteristics of the batteries of the autonomous vehicles, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel. Process 700 may be executed by processing resources within network 670, for example.

In some contexts, fleets of autonomous vehicles (e.g. drones) may be managed to perform tasks such as surveying crop fields and delivering packages. In another context, a factory includes a fleet of land-based robots for moving and sorting inventory. In still another context, a fleet of aquatic robots is surveying a seabed. In some contexts, the autonomous vehicles are remote from being accessed by human operators.

Using the systems and methods of this disclosure, the autonomous vehicles may report electrical characteristics and/or temperature data of their smart battery to a network such as network 670. Network 670 may store and process the electrical characteristics reported by the smart batteries and make fleet level decisions based on the electrical characteristics. For example, if a smart battery is indicating a reduced charge capacity due to the battery being at the end of its lifetime, the device that is being powered by that smart battery may be sent on shorter or lower risk deployments. In another example, an autonomous vehicle powered by a smart battery that exhibits battery failure indicators may be removed from service and not deployed. An automated message may be sent to a smartphone 611, tablet 615, or personal computer 613 via email, text, or otherwise to provide an alert that a smart battery has exhibited battery failure indicators or is coming to the end of its battery life. This will provide notification to a manager or service technician to replace or service the smart battery and corresponding device. In this way, fleets of autonomous vehicles can be managed and/or serviced more efficiently to decrease down-time.

In process block 705, first electrical data of a first autonomous vehicle battery of a first autonomous vehicle is received.

In process block 710, second electrical data of a second autonomous vehicle battery of a second autonomous vehicle is received.

In process block 715, the first or second autonomous vehicle is selected based at least in part on the first and second electrical data. In one embodiment, the selected first or second autonomous vehicle is selected to complete a deployment m1ss10n.

In process block 720, a deployment command is sent to the selected autonomous vehicle. The deployment command may include propulsion instructions for the selected autonomous vehicle. In one embodiment, the propulsion instructions are for the autonomous vehicle to return to a base or a charging station. In one embodiment, the propulsion instructions are to disable the propulsion mechanism of the autonomous vehicle so that the autonomous vehicle cannot be deployed. In one embodiment, the propulsion instructions include GPS (Global Positioning Satellite) coordinates of a deployment mission. The deployment command may be sent from network 670 via communication channel 641, for example.

In one embodiment, process 700 further includes receiving a first unique identifier of the first autonomous vehicle and receiving a second unique identifier of the second autonomous vehicle. Selecting the first or second autonomous vehicle to complete the deployment mission in processing block 715 is based at least in part on the first and second unique identifier, in one embodiment. The first unique identifier may identify an autonomous vehicle that is more capable of employing the deployment mission than the second unique identifier, for example.

In accordance with one embodiment of the disclosure, electrical data corresponding to particular smart batteries and devices is presented in a graphical user interface and provided to a manager of a fleet of autonomous vehicles via smartphone 611, tablet 615, or personal computer 613. Network 670 may receive a user input from the user/manager via the graphical interface. The user input may select which autonomous vehicle should be deployed on a deployment mission based on being presented with the information about the devices and their corresponding battery electrical characteristics. Network 670 may then pass the selection of the autonomous vehicle to the selected autonomous vehicle via communication channel 641.

Some embodiments of the disclosure make use of traditional wire charging of a battery or smart battery while other embodiments of the disclosure make use of wireless charging of a battery or smart battery using transmit charging coils and receive charging coils. Most robotic applications today require human intervention, a wired connection or exposed physical contacts to recharge batteries or power the device. Drone applications, such as aerial photography, are typically human supervised. When the drone runs out of power, a person plugs the drone into a charger. To enable new, autonomous drone applications, such as unattended, automatic daily inspection of a field or bridge, with the human operator absent, it is necessary for drones to be able to charge themselves.

An alternative method to manually removing, plugging, and charging batteries has been mechanical docking stations for robots. These docking stations typically have exposed mechanical contacts or connectors that the robots physically connect to. In many applications today, robots can automatically dock themselves. However, these mechanical docking stations are prone to fail over time.

In today's manual or mechanical re-charging, a mechanical connection is required to plug the device in for charging, and the physical connection comes apart when charging is complete. Automatically making and breaking mechanical connections has the following problems: (1) it is unreliable (often the operation fails due to sensing or actuating errors); (2) it leads to wear of contacts/connectors, which fail after a certain number of plug/unplug cycles; and (3) it adds cost and complexity to the system, since some form of robot arm, human intervention or mechanical contact is needed to accomplish the plugging and un-plugging (and often these mechanisms must produce large amounts of force, adding to its cost and complexity); and (4) the additional mechanical parts in the charging mechanism are a further source of system-level unreliability, as the exposed ohmic contacts are prone to corrosion and are affected by water due to weather.

A mechanism for reliably re-charging drones, mobile, and/or aquatic robots, with reduced additional mechanical parts is desirable. Additionally, reducing reliance on wear-prone and water-susceptible ohmic electrical connections is desirable. The capability for robots to reliably recharge themselves would enable a host of autonomous robot operations.

Figure 8:
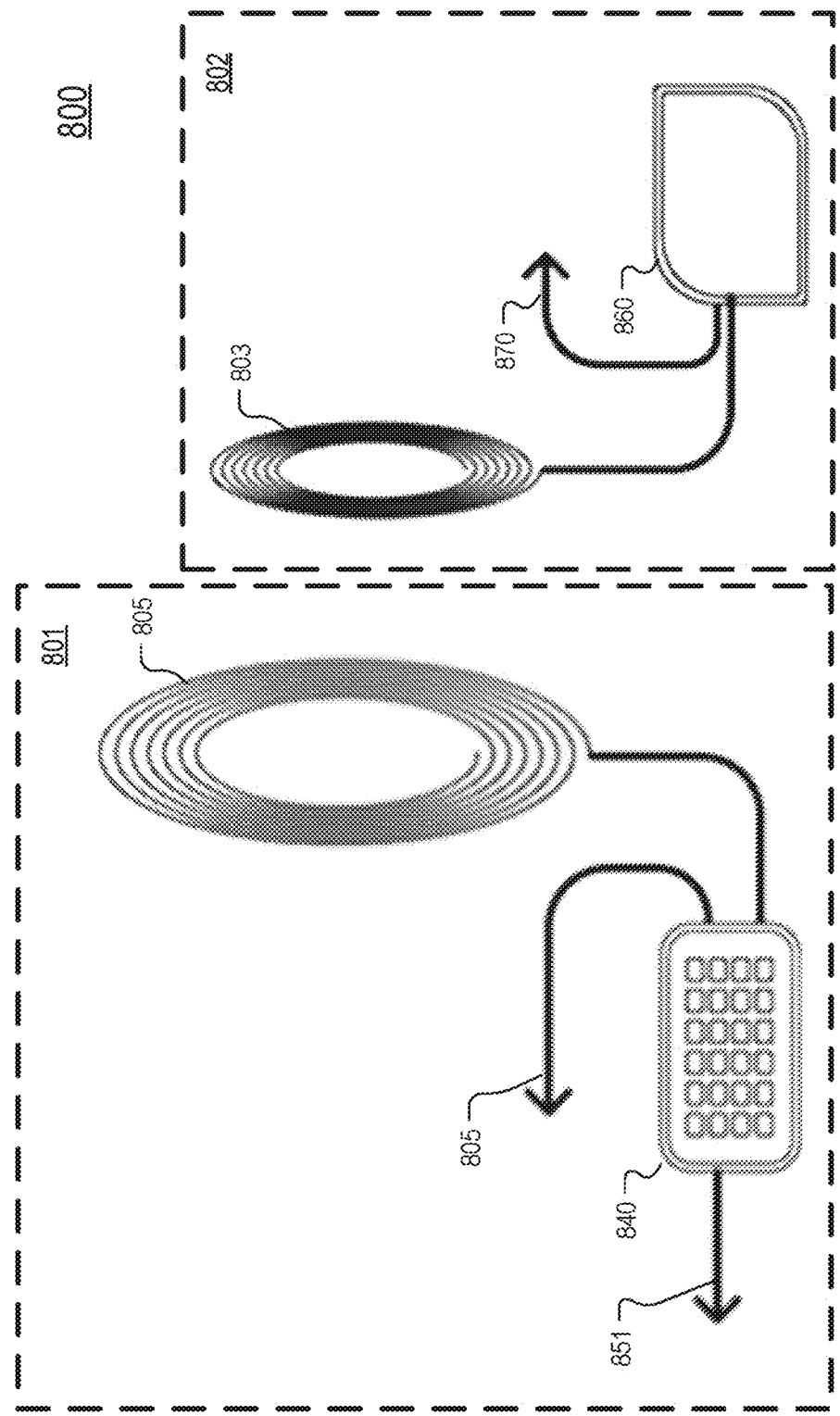
FIG. 8 includes an example wireless charging system that includes a wireless charging station including a transmitter coupled to a transmit charging coil, in accordance with an embodiment of the disclosure.

FIG. 8 includes an example wireless charging system 800 that includes a wireless charging station 801 including a transmitter 840 coupled to a transmit charging coil 805, in accordance with an embodiment of the disclosure. Example wireless charging system 800 further includes a wireless power reception module 802 including a receiving charge coil 803 coupled to receive wireless energy from transmit charging coil 805 and deliver the energy to receiver 860. Receiver 860 is coupled to charge a battery via output 870. Receiver 860 may include a receiver circuit including a rectifier and power regulator similar to rectifier 215 and power regulator 235 of FIG. 2. Transmitter 840 is coupled to send and receive data via data channel 851, in FIG. 8. Transmitter 840 is also coupled to receive electrical power from a power supply via input 805, in the illustrated embodiment.

Figure 9A:
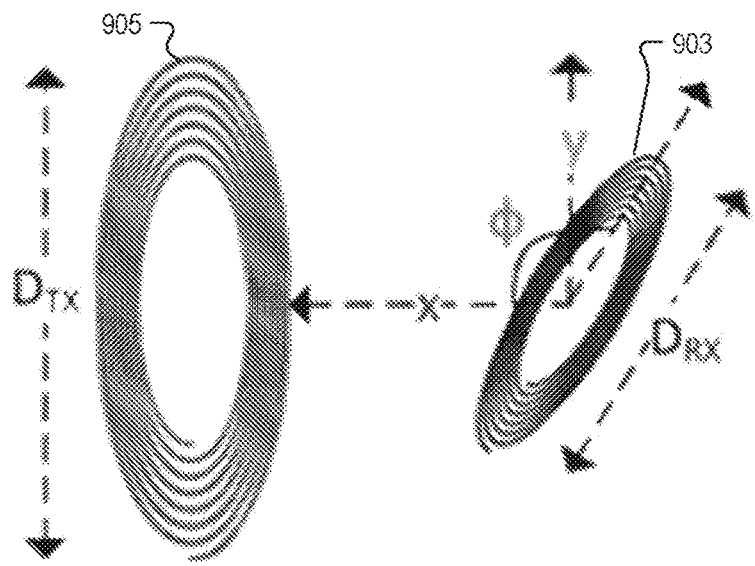
FIG. 9A illustrates a wireless power range diagram that includes a transmit charging coil and a receive charging coil, in accordance with an embodiment of the disclosure.

FIG. 9A illustrates a wireless power range diagram that includes transmit charging coil 905 and receive charging coil 903, in accordance with an embodiment of the disclosure. FIG. 9A shows the flexible wireless power range as it relates to distance x and y and angle Phi. Receive charging coil 903 may be used as receive charging coil 803, 403, or 203. Transmit charging coil 905 may be used as transmit charging coil 905, 405, or 205.

Figure 9B:
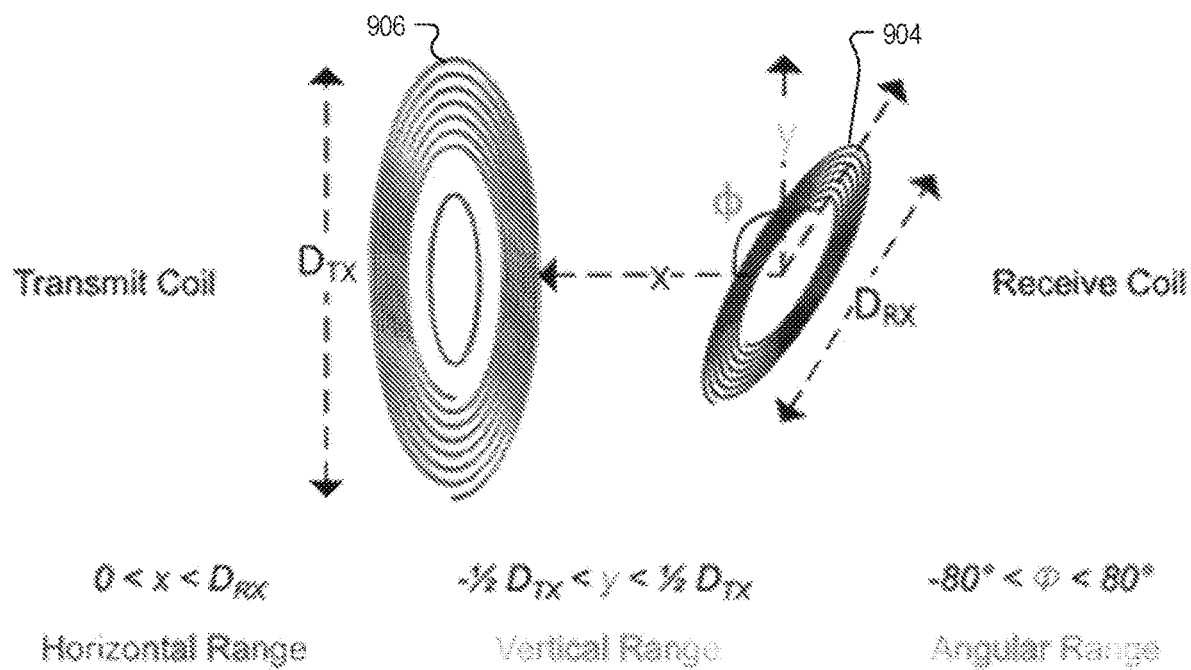
FIG. 9B illustrates a wireless power range diagram that includes a transmit charging coil and a receive charging coil, in accordance with an embodiment of the disclosure.

FIG. 9B illustrates a wireless power range diagram that includes transmit charging coil 906 and receive charging coil 904, in accordance with an embodiment of the disclosure. FIG. 9B shows the flexible wireless power range with coil-size dependencies as it relates to distance x and y, angle Phi, Diameter (DTX) of transmit charging coil 906, and Diameter (DRX) of receive charging coil 904. Receive charging coil 904 may be used as receive charging coil 803, 403, or 203. Transmit charging coil 905 may be used as transmit charging coil 905, 405, or 205.

Figure 12:
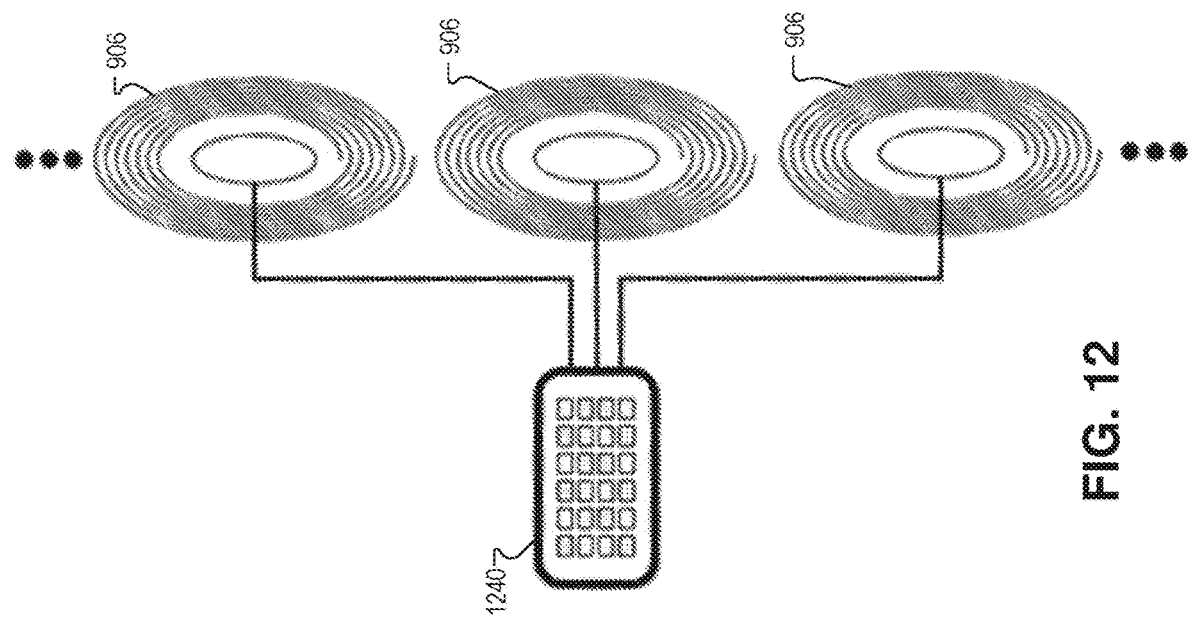
FIG. 12 illustrates an example multi-coil transmitter coupled to drive a plurality of loop and coil transmit charging coils, in accordance with an embodiment of the disclosure.
Figure 10:
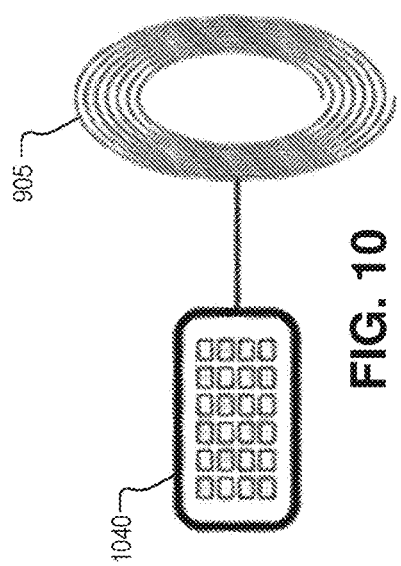
FIG. 10 illustrates an example single coil transmitter coupled to drive a single coil transmit charging coil, in accordance with an embodiment of the disclosure.
Figure 11:
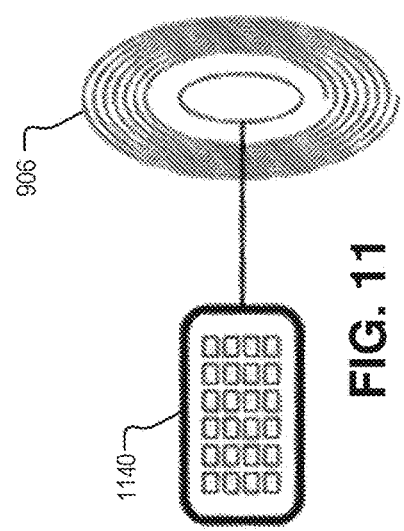
FIG. 11 illustrates an example loop and coil transmitter coupled to drive a single loop and coil transmit charging coil, in accordance with an embodiment of the disclosure.

FIGS. 10, 11, and 12 show different configurations of transmit charging coils coupled to transmitters, in accordance with embodiments of the disclosure. FIG. 10 illustrates a single coil transmitter 1040 is coupled to drive a single coil transmit charging coil 905. FIG. 11 illustrates a loop and coil transmitter 1140 is coupled to drive a single loop and coil transmit charging coil 906. With a coil transmit charging coil such as coil transmit charging coil 905, the impedance of the coupled coils (the receive charging coil and the transmit charging coil) in a wireless power system decreases as the receive charging coil gets farther away, or more particularly, as the coupling coefficient between the transmitter and receiver coil decreases. With a loop and coil transmit charging coil such as loop and coil transmit charging coil 906, the impedance of the coupled coils in the wireless charging system increases as the coupling of coefficient decreases. In some contexts, it may be preferable to have the impedance increase so that when a receiver coil moves away, the power amplifier (e.g. amplifier A1 of FIG. 13) naturally will drive a higher load impedance, which could be safer because it will not output as much power into the transmit coil.

FIG. 12 illustrates a multi-coil transmitter 1240 coupled to drive a plurality of loop and coil transmit charging coils 906. Having a plurality of transmit charging coils 906 may be helpful in a wireless charging system so that one or more receive charging coil(s) can receive wireless energy from any of the transmit charging coils, which can increase the charging speed when the receiver charging coil(s) is not perfectly positioned in relation to one transmit charging coil. Having a plurality of transmit charging coils 906 may also be helpful in a wireless charging system so that multiple receive charging coils can receive wireless energy from any of the transmit charging coils.

As discussed in association with FIG. 3, a drone (e.g. 302) has the ability to land on a charging mat or landing pad 321 to charge a battery (e.g. 301) via a wireless energy delivery from transmit charging coil 305 to one or more receive charging coils 303. This gives the drone the ability to receive wireless power to charge its battery with no mechanical connections other than landing on the charging mat.

In one embodiment, a charging mat may include multiple transmit charging coils, as illustrated in FIG. 12, and the multiple transmit charging coils may be driven by a single multi-coil transmitter such as 1240. In this way, the exact landing position of the drone on the landing pad becomes less important to align the receiving charge coil(s) of the drone with a single transmit charging coil. Rather, the one or more receiving charge coils onboard the drone can receive wireless power from the transmit charging coils that are spread through the charging mat. Receive charging coils can be placed on the landing leg or parallel landing skid of the body of the drone, for example.

In addition to drones, mobile robots may also make use of the embodiments of this disclosure. A mobile robot travels on the ground (rather than in the air). A wheeled or tracked robot rolls to the vicinity of a transmitter and transmit charging coil and then charges wirelessly. A legged robot walks (or otherwise travels) to the vicinity of the transmitter and transmit charging coil and then charges wirelessly.

The transmit and receive coils may include a wound inductor with tuning components to dynamically tune the wireless power system for maximum efficiency at a single frequency. The shape of the coils can be at least one of a flat spiral, a flat square, a solenoidal spiral. The transmit coils may be flat to minimize the overall thickness of the transmitter. The receiver coils mounted on the robot may be solenoidal spirals to minimize the coil size.

Aquatic robots (e.g. 402 in FIG. 4) may also make use of the embodiments of this disclosure. An aquatic robot travels in water along the surface of the water or fully submerged underwater. A propelled aquatic robot navigates to the vicinity of the transmitter and transmit charging coil and then charges wirelessly.

The transmit charging coil (e.g. 405) may include a wound inductor with tuning components to dynamically tune the wireless power system for maximum efficiency at a single frequency. The shape of the coils can be at least one of a flat spiral, a flat square, a solenoidal spiral. The transmit charging coil may be solenoidal to allow for a small section or the entire aquatic robot to navigate into the interior space of the solenoidal transmit coil. As the aquatic robot naturally moves due to water currents and waves, the physical design of the transmit coil helps keep the aquatic robot aligned for charging. The receiver charging coils (e.g. 403) mounted inside the robot may be flat spiral or solenoidal spirals to minimize the coil size. The advantage of such a system (e.g. 400) for aquatic robots is that costly underwater connectors can be avoided, and the water-tight seal protecting other electronics inside the robot from water damage does not need to be broken in order to access the battery for charging.

In one embodiment of an aquatic charging system (e.g. 400), the transmitter connects to one primary transmit charging coil (e.g. 405) that transmits wireless power to a receive charging coil (e.g. 403). In a different embodiment, the transmitter connects to multiple transmit charging coils and each transmit charging coil can wirelessly power a receive charging coil at the same time. One potential advantage of this system is that a single transmitter unit can provide power to multiple transmit charging coils, which in turn can charge multiple receivers.

Figure 13:
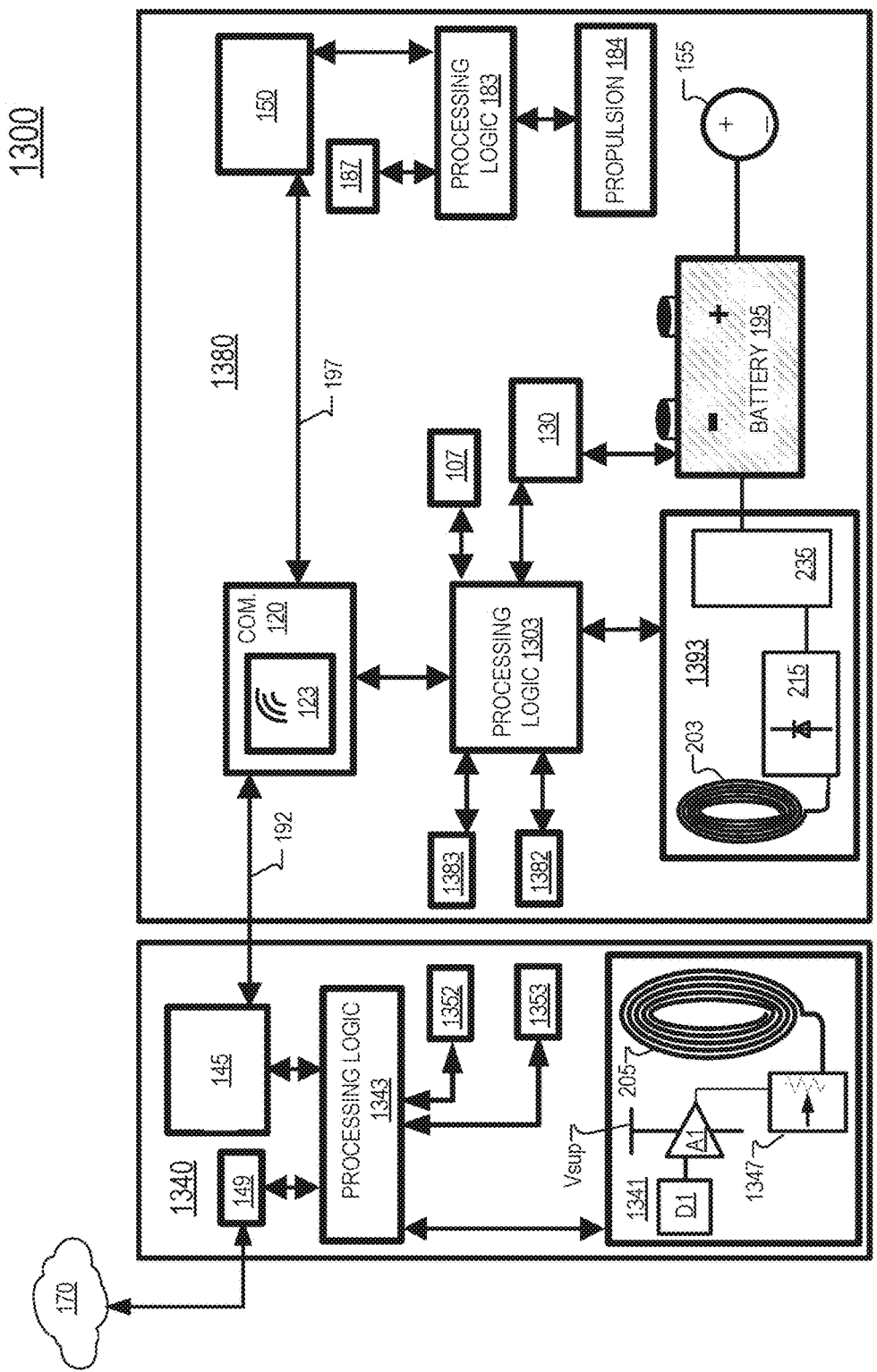
FIG. 13 illustrates an example system that includes an un-manned vehicle and a wireless charger that is configured to wirelessly charge a battery of the un-manned vehicle by transmitting wireless energy from a transmit charging coil to a receive charging coil, in accordance with an embodiment of the disclosure.

FIG. 13 illustrates a system 1300 that includes an un-manned vehicle 1380 and a wireless charger 1340 that is configured to wirelessly charge a battery 195 of un-manned vehicle 1380 by transmitting wireless energy from transmit charging coil 205 to receive charging coil 203, in accordance with an embodiment of the disclosure. In FIG. 13, wireless charger 1340 includes processing logic 1343 communicatively coupled to port 149, communication element 145, and power delivery module 1341. Processing logic 1343 is also coupled to emitter 1352 and sensing module 1353, in the illustrated embodiment. Power delivery module 1341 includes an amplifier A1 coupled to receive a signal from gate driver D1 at an input of the amplifier A1. Amplifier A1 is coupled to a voltage source Vsup to supply power to amplifier A1. An impedance tuner 1347 is coupled between transmit charging coil 205 and an output of amplifier A1, in the illustrated embodiment. Processing logic 1343 is coupled to power delivery module 1341. Processing logic 1343 may be configured to control a signal at the output of gate driver D1 and processing logic 1343 may also be configured to tune an impedance of impedance tuner 1347.

In FIG. 13, example un-manned vehicle 1380 includes processing logic 183, propulsion mechanism 184, memory 187, communication element 150, power source receiver 155, communication interface 120 including wireless communication interface 123, processing logic 1303, memory 107, measurement module 130, battery 195, charging module 1393, emitter 1382, and sensing module 1383. In the illustrated embodiment, charging module 1393 includes a receive charging coil 203 coupled to inverter 215 which is coupled to power regulator 235 and power regulator is coupled to charge battery 195. In some embodiments of system 1300, communication interface 120 does not include wireless communication interface 123 and communication interface 120 utilizes wired communication only.

Sensing module 1353 of charger 1340 is configured to generate an output signal in response to sensing a signal. Processing logic 1343 is coupled to receive the output signal from the sensing module 1353. In one embodiment, processing logic 1343 is configured to adjust a transmission of the wireless energy transmitted by transmit charging coil 205 in response to the output signal received from the sensing module 1353. In one embodiment, charger 1340 includes an infrared motion detector positioned to sense motion in an environment around the charger and the infrared motion detector outputs the outputs signal in response to received infrared light. Processing logic 1343 may be configured to disable the transmitting of wireless energy when the output signal indicates motion in the environment around the charger.

In one embodiment, emitter 1352 is configured to emit infrared light within a frequency band and sensing module 1353 includes a photosensor configured to receive light within the frequency band and reject the light outside the frequency band. In one embodiment, the photosensor includes a photodiode having a bandpass filter that passes the light within the frequency band of the infrared light and rejects the light outside the frequency band. The photosensor may generate the output signal (e.g. a current signal) in response to an intensity of the light received by the photosensor within the frequency band. In one embodiment, processing logic 1343 is configured to disable the transmitting of wireless energy from transmit charging coil 205 when the output signal indicates that the intensity of the light received by the photosensor within the frequency band is above an infrared threshold. In one embodiment, multiple infrared emitters are used as emitter 1352 and multiple photosensors are used in sensing module 1353 to emit infrared light around a perimeter of charger 1340 to detect humans, animals, or interfering objects. When a human, animal, or object reflects too much infrared light into the photosensors, processing logic 1343 may disable the wireless charging for safety purposes.

In one embodiment, sensing module 1353 include one or more image sensors for capturing images. In one embodiment, the image sensor(s) may be directed to capture images of the surroundings of charger 1340 and to provide those images to processing logic 1343 as the output signal. Processing logic 1343 may disable the transmitting of wireless energy from transmit charging coil 205 when the images indicate that a human, animal, or object may be proximate to charger 1340. In one embodiment, the image sensor(s) may be directed to capture images of an un-manned vehicle 180 approaching the charger via air, land, or water and to provide those images to processing logic 1343 as the output signal. Processing logic 1343 may enable the transmitting of wireless energy from transmit charging coil 205 when the images indicate that an un-manned vehicle 1380 is within range to receive wireless energy from transmit charging coil 205. Processing logic 1343 determining whether the un-manned vehicle is within charging range may include performing image signal processing of the received image and comparing the received images to images stored in a memory included within (not illustrated), or coupled to, processing logic 1343.

In one embodiment, sensing module 1353 includes a thermal camera coupled to generate the output signal received by processing logic 1343. Thermal cameras image infrared light to detect heat. An image from a thermal camera that included a large change in heat from a prior thermal image may indicate the presence of a human or animal. Processing logic 1343 may disable the transmitting of wireless energy from transmit charging coil 205 when the thermal images indicate that a human or animal may be proximate to charger 1340.

In one embodiment, sensing module 1353 includes a microphone coupled to generate an audio signal as the output signal received by processing logic 1343. The processing logic may be configured to enable the transmission of the wireless energy when the audio signal includes a sound of a propulsion blade of propulsion mechanism 184 of un-manned vehicle 1380. The sound of the propulsion blade may have to be over a pre-determined magnitude to determine that the un-manned vehicle 1380 is close enough to receive wireless energy from transmit charging coil 205.

In one embodiment, un-manned vehicle 1380 includes a light emitting diode (LED) as emitter 1382. The LED may be centered within the receive charging coil 203. The LED is configured to emit a wavefront within a frequency band. The frequency may be visible or non-visible light (e.g. infrared). Sensing module 1353 on charger 1340 may include a photosensor configured to receive light within the frequency band and reject light outside the frequency band. The photosensor may be centered within the transmit charging coil 205 or 305. The output signal generated by the photosensor indicates how close the LED of 1382 is from the photosensor of 1353 and thus how close receive charging coil 203 is from transmit charging coil 205. A high magnitude output signal indicates to processing logic 1343 that receive charging coil 203 is positioned to receive wireless energy from transmit charging coil 205 and processing logic 1343 may be configured to increase the wireless energy transmitted by the transmit charging coil 205 based on a magnitude of the light received by the photosensor (as indicated by the output signal) that is inside the frequency band.

Figure 14:
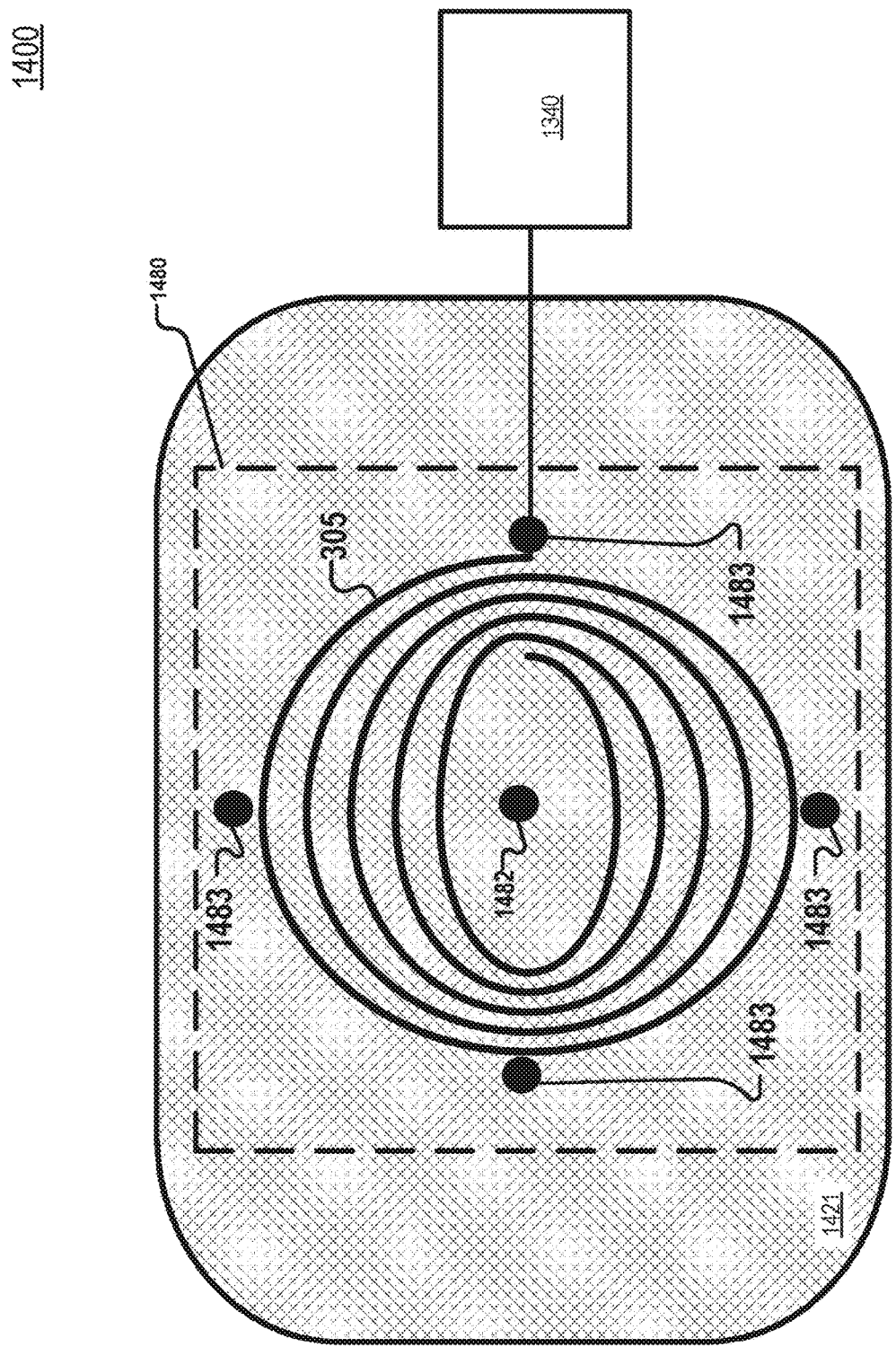
FIG. 14 illustrates an un-manned vehicle including example emitters and sensors, in accordance with an embodiment of the disclosure.

In the system 1400 of FIG. 14, an emitter 1482 of un-manned vehicle 1480 is centered within a receive charge coil (not illustrated) of the un-manned vehicle 1480 that is illustrated as axially aligned with transmit charging coil 305 to facilitate efficient wireless charging, in accordance with an embodiment of the disclosure. Transmit charging coil 305 included in charging mat 1421 is driven by charger 1340, in the illustrated embodiment.

Returning to FIG. 13, in one embodiment, processing logic 1343 is configured to adjust the transmission of the wireless energy from transmit charging coil 205 based on radio data received by a wireless radio included in communication element 245 where the radio data was received from a wireless radio of wireless communication interface 123 of the un-manned vehicle. In one embodiment, the radio data includes a voltage value across rectifier 215. In one embodiment, vehicle processing logic 183 is configured to control propulsion mechanism 184 in response to an electrical measurement of the rectifier. For example, the vehicle processing logic 183 may direct propulsion mechanism 184 to three-dimensional space such that a voltage on the rectifier 215 increases to increase charging efficiency between coil 205 and 203.

In one embodiment, vehicle processing logic 183 is configured to control propulsion mechanism 184 in response to radio data received by wireless communication interface when the radio data was received from a wireless radio of communication element 145. In one embodiment, the radio data includes a current drawn by amplifier A1. In one embodiment of FIG. 13, processing logic 1343 is configured to adjust the transmission of the wireless energy in response to measuring a current drawn from Voltage supply Vsup by amplifier A1. For example, the vehicle processing logic 183 may direct propulsion mechanism 184 to three-dimensional space such that a current drawn by amplifier A1 increases to increase charging efficiency between coil 205 and 203 since a higher magnitude of current indicates a closer proximity of coils 205 and 203.

Figure 15:
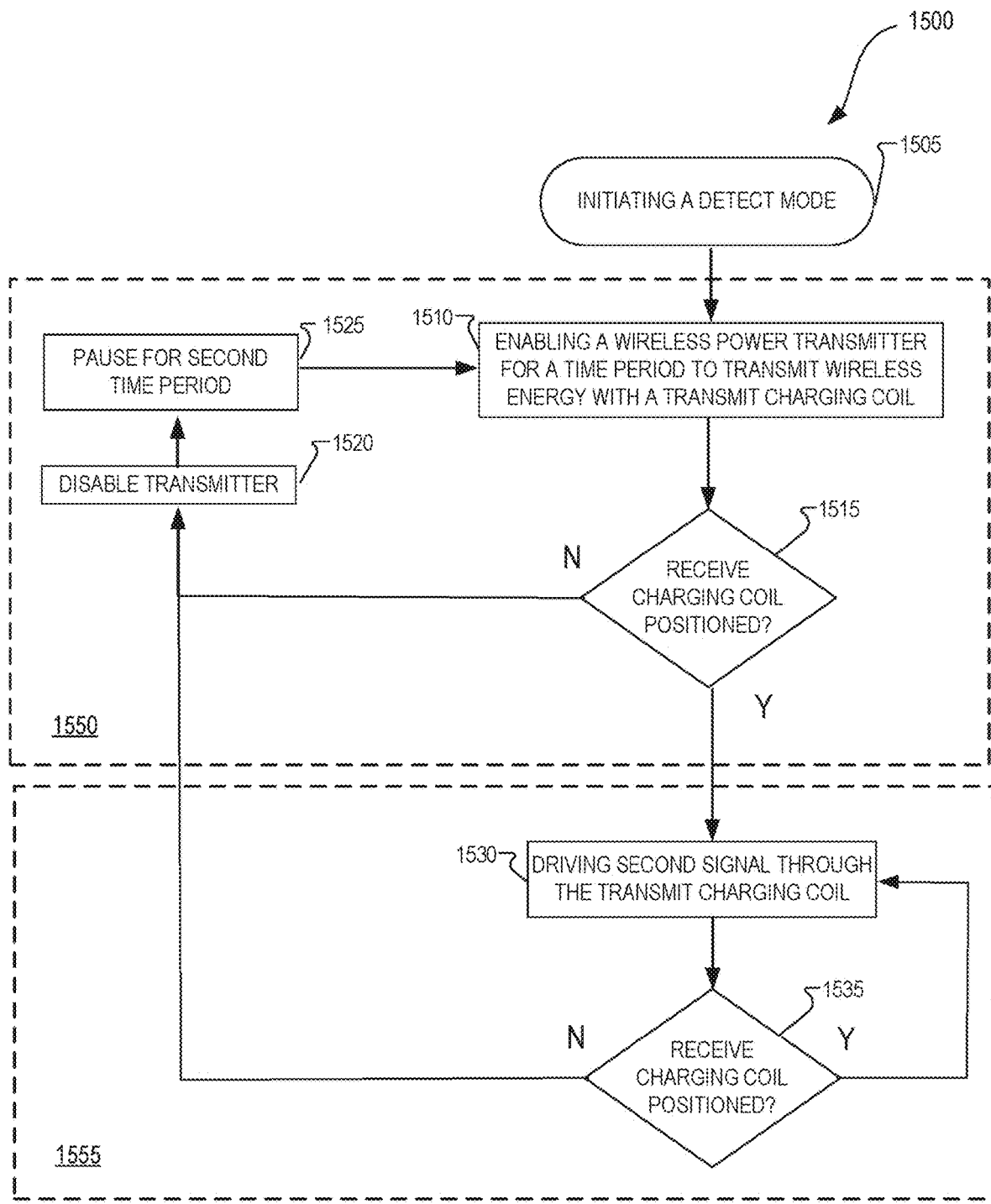
FIG. 15 illustrates a flow chart showing an example process of wirelessly delivering energy, in accordance with an embodiment of the disclosure.

FIG. 15 illustrates a flow chart showing an example process 1500 of wirelessly delivering energy, in accordance with an embodiment of the disclosure. The order in which some or all of the process blocks appear in process 1500 should not be deemed limiting. Rather, one of ordinary skill in the art having the benefit of the present disclosure will understand that some of the process blocks may be executed in a variety of orders not illustrated, or even in parallel.

In process block 1505, a detect mode 1550 is initiated and process 1500 proceeds to process block 1510 within detect mode 1550. In process block 1510, a wireless power transmitter is enabled for a period of time (e.g. 1 second) where enabling the wireless power transmitter includes driving a first signal through a transmit charging coil (e.g. 205/305) to transmit wireless energy. A wireless transmitter may include all or some of the elements of charger 1340. After process block 1510, process 1500 continues to process block 1515 to detect when a receive charging coil (e.g. 203) is positioned to receive the wireless energy from the transmit charging coil. When the received charging coil is positioned to receive the wireless energy, process 1500 proceeds to a charge mode 1555 and process block 1530. When the received charging coil is not positioned to receive the wireless energy, process 1500 remains in detect mode 1550 and process 1500 continues to process block 1520 where the wireless power transmitter is disabled. After process block 1520, process 1500 proceeds to process block 1525 to pause for a second time period (e.g. 1 second). The second time period is longer than the time period of process block 1510, in some embodiments.

Revisiting process block 1515, there are a variety of ways to detect when the receive charging coil is positioned to receive the wireless energy from the transmit charging coil.

In one embodiment, detecting when the receive charge coil is positioned to receive the wireless energy from the transmit charging coil includes sensing the magnitude of wireless energy transmitted by the wireless power transmitter by measuring a current provided to an amplifier (e.g. A1 of FIG. 13) of the wireless power transmitter. A larger current provided to the amplifier is indicative of a receive charging coil positioned closer to the transmit charging coil while a smaller current provided to the amplifier is indicative of a receive charging coil positioned farther from the transmit charging coil.

In one embodiment, detecting when the receive charge coil is positioned to receive the wireless energy from the transmit charging coil includes sensing the magnitude of wireless energy received by the receive charging coil by wirelessly receiving a rectifier value representative of a rectifier voltage or current of a rectifier (e.g. 215) within a receive circuit coupled to the receive charging coil. The receive circuit may include charging module 1393 and processing logic 1303. The rectifier value may be received by a wireless radio of communication element 145 and transmitted by wireless communication interface 123. In FIG. 13, rectifier 215 and power regulator 235 are included in the receive circuit coupled to receive charging coil 203.

Returning to charge mode 1555, process 1500 proceeds to process block 1535 after executing process block 1530. Process block includes detecting when a receive charging coil (e.g. 203) is positioned to receive the wireless energy from the transmit charging coil, similar to process block 1515. The variety of detection techniques described with regard to process block 1515 may also be used with process block 1535. When the received charging coil is positioned to receive the wireless energy, process 1500 continues in charge mode 1555 continues executing process block 1530. When the received charging coil is not positioned to receive the wireless energy, process 1500 returns to detect mode 1550 and process 1500 continues to process block 1520 where the wireless power transmitter is disabled.

In one embodiment, charge mode 1555 includes dynamically tuning an impedance of the transmit charging coil to increase a charging efficiency at a frequency of the wireless energy transmitted from the transmit charging coil to the receive charging coil. In one embodiment, processing logic 1383 controls impedance tuner 1347 to adjust an impedance of the transmit charging coil 205. In one embodiment, during charge mode 1555, the reactance of the transmit charging coil 205 or receive charging coil 203 is dynamically tuned to increase a charging efficiency at a frequency of the wireless energy transmitted from the transmit charging coil to the receive charging coil. In one embodiment, inductance is added in series with a charge coil by open and closing signal paths (by switching MOSFETS on and off, for example) that include inductors. Capacitance can be added using similar techniques.

Figure 16:
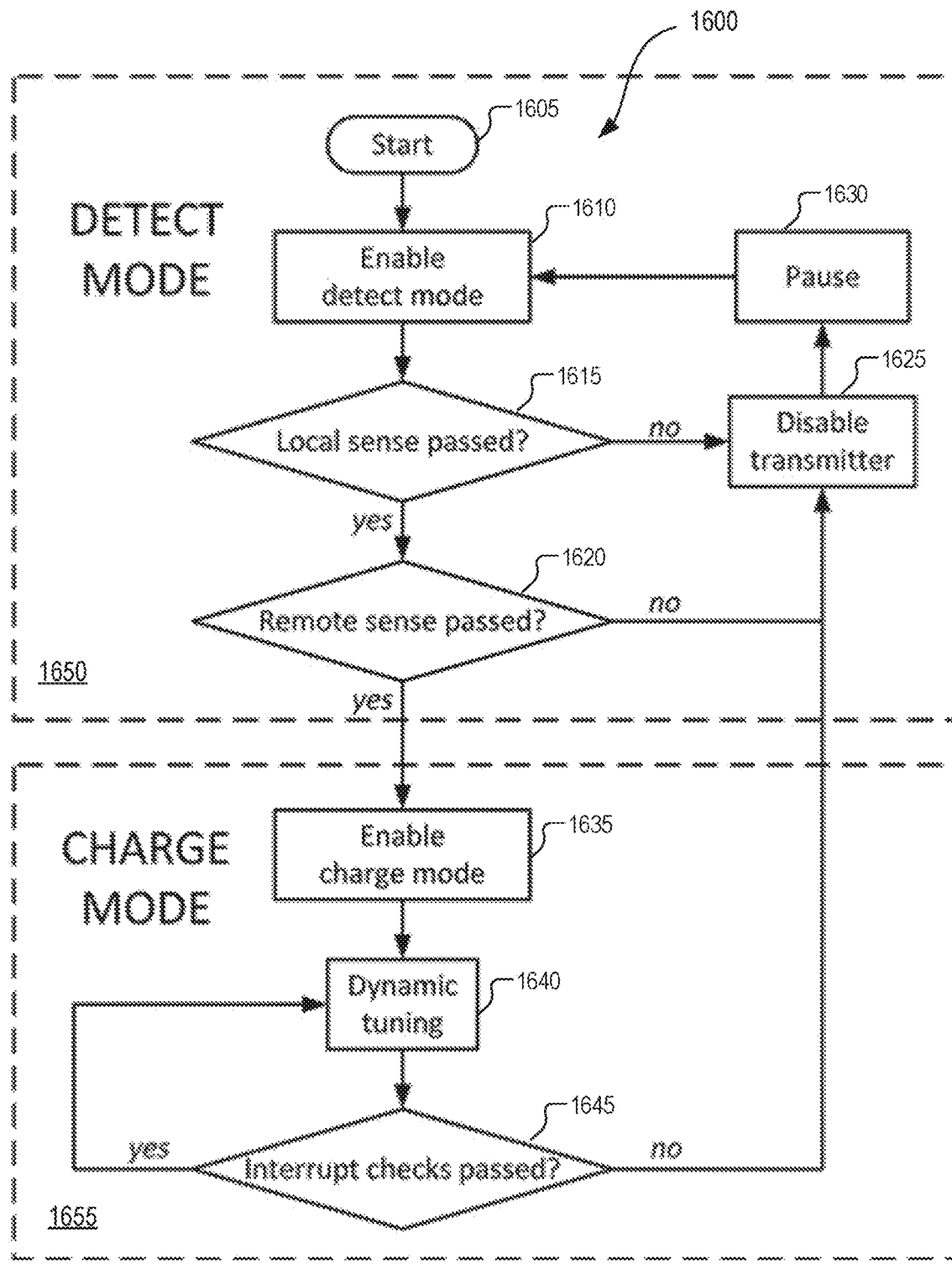
FIG. 16 includes an example process that includes a detect mode and a charge mode, in accordance with an embodiment of the disclosure.

FIG. 16 includes an example process 1600 that includes a detect mode 1650 and a charge mode 1655, in accordance with an embodiment of the disclosure. The order in which some or all of the process blocks appear in process 1600 should not be deemed limiting. Rather, one of ordinary skill in the art having the benefit of the present disclosure will understand that some of the process blocks may be executed in a variety of orders not illustrated, or even in parallel.

In process 1600, detect mode 1650 includes a two-step sensing procedure prior to proceeding to charge mode 1655. In the illustrated embodiment, the first sensing procedure is a local sensing (close range) procedure of process block 1615 and the second sensing procedure is a remote (long range) sensing procedure of process block 1620. Long-range sensing mechanisms allow an un-manned vehicle to navigate towards the charger/transmitter, and short-range sensing mechanisms allow the un-manned vehicle to accurately position itself so that the receive charging coil is positioned in-range of the transmit charging coil.

In one embodiment, processing logic 1303 can communicate with the vehicle processing logic 183 over at least one of UART, SPI, I2C or CAN bus directly wired communication protocols via communication channel 197. Alternatively, processing logic 1303 can communicate wirelessly (via Wi-Fi or Bluetooth) with vehicle processing logic 183 via communication channel 197. Although processing logic 1303 and the vehicle processing logic 183 are close together, a wireless connection between them may allow for easier manufacturing and integration of the wireless power system with the un-manned vehicle, as well as less weight. Sensor measurements made by the wireless power transmitter (e.g. of 1340) and processing logic 1303 can be communicated to the vehicle processing logic 183. The position of the un-manned vehicle can be inferred from at least one of the sensing mechanisms. This data can be incorporated with the flight control software and help the un-manned vehicle to navigate and precisely align itself on the transmit charging coil in a suitable position for wireless charging. The un-manned vehicle can also communicate to the wireless power transmitter of charger 1340 or processing logic 1303 over a wired or wireless communication interface. In this configuration, the wireless power system can be enabled or disabled as commanded by the un-manned vehicle 1380.

In embodiments of the disclosure, proximity and motion sensors may be used to sense when an object or a person is moving close to the drone landing pad. In process block 1615, these proximity sensors are one of the methods used in the "local sense" procedural check. Motion sensors can be implemented by at least one of an LED light-based sensor, a video camera, proximity infrared sensors, thermal cameras, acoustic sensors sensing the audible noise of the drone propellers, radar, or otherwise. If these close-range sensors detect any object or person besides the intended receiver, the transmitter will remain in detect mode until only the intended receiver is in suitable position to begin wireless charging, and people or animals are not in close proximity.

In one embodiment of the close-range robot sensing capability of process block 1615, the magnitude of the transmitted or received power during detect mode 1650 is used as a sensor signal. In process block 1615, transmit power level detection is one of the methods used in the "local sense" procedural check. When the transmitter is enabled in detect mode 1650, the amount of power consumed by the transmitter's power amplifier changes. The transmitter has voltage and current sensing circuitry to monitor the DC voltage and current consumed by the power amplifier. If no receiver is present, the current at a known voltage level will be low. If a receiver coil is in close proximity to the transmit coil, the current at a known voltage will increase. The magnitude of the current may be used to indicate the position of the receiver coil. If the receiver coil is properly positioned, and no other motion is detected, the transmitter will be enabled and enter charge mode 1655. This sensing mechanism may require no additional radio communication between the transmitter and receiver.

In another embodiment of the close-range or long-range robot sensing capability, the transmitter and receiver can communicate across a bidirectional radio communication link such as communication link 192. In process block 1620, this active radio communication link is one of the methods used in the "remote sense" procedural check. When the receiver is powered, it communicates the measured rectified voltage, rectified DC current, battery voltage and other measured parameters back to the transmitter over this radio communication link. When the receiver is in close proximity to the transmit coil, it will receive a small amount of wireless power. When it is close, the rectified voltage will increase and when it is far away, the rectified voltage will decrease. The magnitude of the rectified voltage can indicate the position of the receiver coil. During detect mode 1650, if the rectified voltage is within a predetermined range, the receiver is in a suitable position and the transmitter will be enabled and enter charge mode.

In process 1600, once both the local sensing procedure (process block 1615) and the remote sensing procedure (process block 1620) is passed, process 1600 proceeds to charge mode 1655 and process block 1635. After process block 1635, process 1600 proceeds to process block 1640 where dynamic tuning of the transmit charging coil occurs (e.g. using impedance tuner 1347) to make the wireless charging more efficient. After process block 1640, process 1600 proceeds to process block 1645 for interrupt checking. If the interrupt checks are passed, process 1600 returns to process block 1640 for further dynamic tuning. In one embodiment, the interrupt checks include executing the local sense procedure(s) of process block 615 and the remote sensing procedure(s) of process block 1620 to make sure that it is safe to continue charging and to ensure that the receive charging coil is positioned to receive the wireless energy from the transmit charging coil. If the interrupts checks are not passed in process block 1640, process 1600 proceeds to process block 1625 and then process block 1630. Process block 1625 and 1630 may operate the same as process blocks 1520 and 1525, respectively.

In another embodiment of the close-range or long-range robot sensing capability, the receiver has electric and magnetic field sensors. In process block 1620, these remote sensors are one of the methods used in the "remote sense" procedural check. When the transmitter is enabled in detect mode 1650, the magnitude of the sensed electric and magnetic field indicates the position of the drone. Since the electric field strength is stronger close to the outer turns of the transmit coil, and the magnetic field is stronger close to the center of the transmit coil, the measured field strengths can be used to accurately determine the position of the receiver. The measured field strengths are sent back to the transmitter over the radio communication link and the transmitter will be enabled if the receiver is in a suitable position to enter charge mode 1655.

In another embodiment of the close-range or long-range robot sensing capability, the received signal strength indicator (RSSI) of the radio communication link can be used to infer the distance between the transmitter and the receiver units. In process block 1620, this RSSI signal is one of the methods used in the "remote sense" procedural check. This RSSI measurement is communicated to the robot controller and can be used to allow the robot to navigate towards the transmitter in real-time.

Implementing embodiments of this disclosure may enable autonomous and guided un-manned vehicle charging with high reliability and reduce mechanical parts required for charging. Implementing embodiments of this disclosure may also increase the reliability of charging by eliminating the mechanical connector/contact, which can fail to conduct electricity even if it is positioned perfectly. Mechanical contacts also can break or wear out after many plug/unplug cycles. Implementing embodiments of this disclosure may also allow robots to function reliably outdoors, in rainy or moist conditions. The elimination of ohmic contact eliminates the possibility of short circuit due to water, as well as corrosion on exposed electrical contacts. In the disclosure, the various un-manned vehicles may land on or drive up to a wireless charging station and be charged wirelessly. The wireless charging stations may be placed vertically (e.g. next to un-manned vehicles) or horizontally (e.g. underneath or above un-manned vehicles) for charging un-manned vehicles in different embodiments. The techniques and advantages of this disclosure also apply to drones landing on a charging pad, mobile robots driving up to a charging station on land, and aquatic robots driving up to a waterproof wireless charging station.

Figure 17:
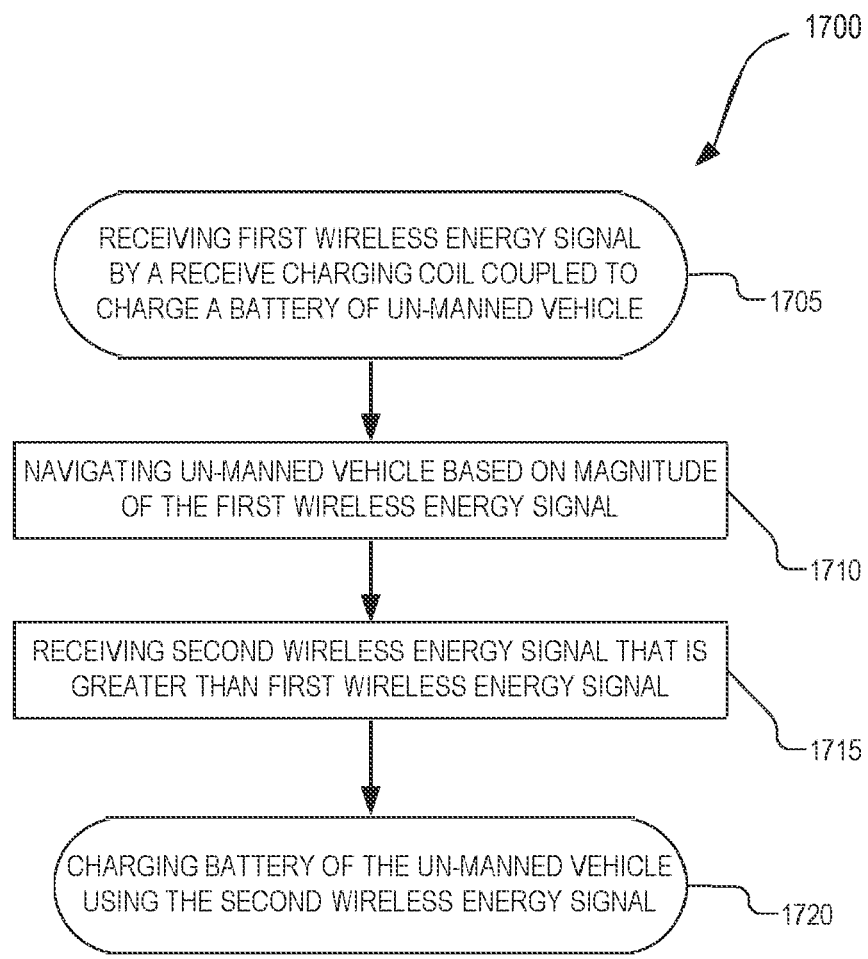
FIG. 17 illustrates a flow chart showing an example process of navigating an un-manned vehicle to a charging station, in accordance with an embodiment of the disclosure.

FIG. 17 illustrates a flow chart showing an example process 1700 of navigating an un-manned vehicle to a charging station, in accordance with an embodiment of the disclosure. The order in which some or all of the process blocks appear in process 1700 should not be deemed limiting. Rather, one of ordinary skill in the art having the benefit of the present disclosure will understand that some of the process blocks may be executed in a variety of orders not illustrated, or even in parallel.

In process block 1705, a first wireless energy signal is received by a receive charging coil (e.g. 203) of an un-manned vehicle. The first wireless energy signal is received from a transmit charging coil (e.g. 205) of the charging station. The receive charging coil is coupled to charge a battery (e.g. 195) that powers the un-manned vehicle (e.g. 1380).

In process block 1710, the un-manned vehicle is navigated based on a magnitude of the first wireless energy signal. Navigating the un-manned vehicle includes navigating the un-manned vehicle closer to the transmit charging coil of the charging station.

In process block 1715, a second wireless energy signal is received by the receive charging coil of the un-manned vehicle. The second wireless energy signal is received from the transmit charging coil and the second wireless energy signal is greater than the first wireless energy signal. In process block 720, the battery of the un-manned vehicle is charged using the second wireless energy signal.

In one embodiment, process 1700 further includes measuring an electric field or magnetic field strength by a first and second sensor at two different points of the un-manned vehicle where navigating the un-manned vehicle is further based on a first measurement from the first sensor and a second measurement from the second sensor. The first and second sensors may be included in sensor module 1383, in one embodiment. The first and second sensors may be Hall effect sensors, in one embodiment. FIG. 14 shows example sensors 1483 may be positioned at a radius on the un-manned vehicle that is similar to the radius of the transmit charging coil 305 so that two or more sensors can be positioned to sense the electric or magnetic field on the outside edge of transmit charging coil 305 since the electric and magnetic field will be strongest along the outside edge of the transmit charging coil 305.

In one embodiment, process 1700 further includes measuring a received signal strength indicator (RSSI) of a radio communication transmitted by the charging station and navigating the un-manned vehicle is further based on the RSSI.

In accordance with one embodiment of the disclosure, a method of wirelessly delivering energy comprises initiating a detect mode that includes: enabling a wireless power transmitter for a time period where enabling the wireless power transmitter includes driving a first signal through a transmit charging coil configured to transmit wireless energy; and detecting when a receive charging coil is positioned to receive the wireless energy from the transmit charging coil. The method of wirelessly delivering energy also comprises enabling a charge mode of the wireless power transmitter in response to detecting the receive charging coil is positioned to receive the wireless energy from the transmit charging coil where enabling the charge mode of the wireless power transmitter includes driving a second signal through the transmit charging coil, the second signal driven through the transmit charging coil having a higher electrical power than the first signal driven through the transmit charging coil.

In one embodiment, detecting when the receive charge coil is positioned to receive the wireless energy from the transmit charging coil includes sensing a magnitude of the wireless energy transmitted by the wireless power transmitter by measuring a current provided to an amplifier of the wireless power transmitter.

In one embodiment, detecting when the receive charge coil is positioned to receive the wireless energy from the transmit charging coil includes sensing a magnitude of the wireless energy received by the receive charging coil by wirelessly receiving a rectifier value representative of a rectifier voltage of a rectifier within a receive circuit coupled to the receive charging coil and the rectifier value is received by a wireless radio of the wireless power transmitter.

In one embodiment, detecting the receive charging coil is positioned to receive the wireless energy from the transmit charging coil includes: performing a first sensing procedure including receiving a light measurement from a photosensor of the wireless power transmitter; comparing the light measurement to a threshold light value; disabling the wireless power transmitter for a second time period following the time period when the light measurement is outside a predetermine value range; performing a second sensing procedure when the light measurement is within the predetermined value range; disabling the wireless power transmitter for a second time period following the time period when the second sensing procedure is failed; and continuing to the charge mode when the second sensing procedure is passed.

In one embodiment, the method of wirelessly delivering energy further comprises: disabling the wireless power transmitter for a second time period following the time period when the receive charging coil is not positioned to receive the wireless energy from the transmit charging coil; and returning to the detect mode.

In one embodiment, the time period is shorter than the second time period. In one embodiment, a ramping signal is driven onto the transmit charging coil to gradually increase the wireless energy transmitted by the transmit charging coil from the first signal to the second signal.

In one embodiment, the method of wirelessly delivering energy further comprises: during the charge mode, dynamically tuning a reactance of the transmit charging coil or the receive charging coil to increase a charging efficiency at a frequency of the wireless energy transmitted from the transmit charging coil to the receive charging coil.

In accordance with one embodiment of the disclosure a system comprises a charger including a power delivery module, a sensing module, processing logic and an un-manned vehicle including a battery and a charging module. The power delivery module includes a transmit charging coil for transmitting wireless energy. The sensing module is configured to generate an output signal in response to sensing a signal. The processing logic is coupled to receive the output signal from the sensing module and the processing logic is configured to adjust a transmission of the wireless energy in response to the output signal. The charging module is coupled to charge the battery with the wireless energy received from the transmit charging coil by a receive charging coil included in the charging module.

In one embodiment, the charger of the system includes an infrared motion detector positioned to sense motion in an environment around the charger, the infrared motion detector outputting the output signal in response to received infrared light and the processing logic is configured to disable the transmitting of wireless energy when the output signal indicates motion in the environment around the charger.

In one embodiment, the sensing module includes an image sensor for capturing images and the charger further includes a memory coupled to be read by the processing logic and the processing logic is configured to enable the transmitting of the wireless energy based upon image signal processing of the images compared to one or more images stored in the memory. In one embodiment, the sensing module includes a thermal camera coupled to generate the output signal.

In one embodiment, the un-manned vehicle includes a propulsion blade, and the sensing module includes a microphone coupled to generate an audio signal as the output signal. The processing logic may be configured to enable the transmission of the wireless energy when the output signal includes a sound of the propulsion blade of the un-manned vehicle.

In one embodiment, the un-manned vehicle includes a light emitting diode centered within the receive charging coil, the light emitting diode configured to emit a wavefront within a frequency band and the sensing module includes a photosensor coupled to generate the output signal, the photosensor centered within the transmit charging coil and configured to receive light within the frequency band and reject light outside the frequency band. The processing logic may be configured to increase the wireless energy transmitted by the transmit charging coil based on a magnitude of the light received that is inside the frequency band.

In one embodiment, the charger further includes a first wireless radio and the un-manned vehicle includes a second wireless radio. In one embodiment, the processing logic is also configured to adjust the transmission of the wireless energy based on radio data received by the first wireless radio from the second wireless radio of the un-manned vehicle. In one embodiment, the un-manned vehicle further includes vehicle processing logic and a propulsion mechanism and the vehicle processing logic is configured control the propulsion mechanism in response to radio data received by the second wireless radio from the first wireless radio of the charger.

In one embodiment, the charger further includes an amplifier configured to drive the transmit charging coil and the processing logic is further configured to adjust the transmission of the wireless energy in response to measuring a current provided to the amplifier. In one embodiment, the un-manned vehicle further includes a rectifier coupled to the receive charging coil, vehicle processing logic, and a propulsion mechanism. The vehicle processing logic may be configured to control the propulsion mechanism in response to an electrical measurement of the rectifier.

In accordance with one embodiment of the disclosure, a method of navigating an un-manned vehicle to a charging station comprises: receiving by a receive charging coil of an un-manned vehicle, a first wireless energy signal from a transmit charging coil of the charging station, where the receive charging coil is coupled to charge a battery that powers the un-manned vehicle; navigating the un-manned vehicle based on a magnitude of the first wireless energy signal, where navigating the un-manned vehicle include navigating the un-manned vehicle closer to the transmit charging coil of the charging station; receiving by the receive charging coil of the un-manned vehicle, a second wireless energy signal from the transmit charging coil, where the second wireless energy signal is greater than the first wireless energy signal; and charging the battery of the un-manned vehicle using the second wireless energy signal.

In one embodiment, the method includes measuring an electric field or magnetic field strength by a first and second sensor at two different points of the un-manned vehicle, where navigating the un-manned vehicle is further based on a first measurement from the first sensor and a second measurement from the second sensor.

In one embodiment, the method includes measuring a received signal strength indicator (RSSI) of a radio communication transmitted by the charging station, where navigating the un-manned vehicle is further based on the RSSI.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A smart battery configured to be removably installed on an un-manned vehicle, the smart battery comprising:
   a battery;
   a memory storing a unique identifier of the smart battery;
   a measurement module coupled to the battery and configured to measure characteristics of the battery, the characteristics comprising an electrical characteristic and a battery temperature; and
   battery processing logic coupled to the measurement module and configured to:
   cause the measurement module to measure the characteristics of the battery a plurality of times over different time periods;
   determine an energy capacity of the battery based at least in part on the characteristics of the battery; and
   transmit the energy capacity and the unique identifier to a wireless charger.

2. The smart battery of claim 1, wherein the smart battery is communicatively coupled with the wireless charger, the wireless charger comprising:
   a wireless receiver configured to receive the energy capacity and the unique identifier from the smart battery;
   a communication port configured to wirelessly connect to a network; and
   a charger processing logic coupled to the wireless receiver and the communication port, wherein the charger processing logic is configured to cause the communication port to transmit the received energy capacity and the unique identifier to the network.

3. The smart battery of claim 1, wherein the battery processing logic is further configured to store the characteristics in the memory.

4. The smart battery of claim 1, wherein the characteristics comprise current values measured during a pre-defined time period.

5. The smart battery of claim 1, wherein in response to determining that the energy capacity is below a threshold, the battery processing logic is configured to transmit a depletion of battery charge warning message to the un-manned vehicle.

6. The smart battery of claim 1, wherein the un-manned vehicle is an aerial vehicle configured to determine an amount of air time left based at least on the energy capacity.

7. The smart battery of claim 1, wherein the measurement module is configured to measure the characteristics continuously during operation of the un-manned vehicle.

8. The smart battery of claim 7, wherein the battery processing logic is configured to monitor the energy capacity based on the continuously measured characteristics.

9. The smart battery of claim 1, wherein the battery processing logic is further configured to calculate a time left to depletion of the battery from the energy capacity.

10. A smart battery configured to be removably installed on an un-manned vehicle, the smart battery comprising:
    a battery;
    a memory storing a unique identifier of the smart battery;
    a measurement module coupled to the battery and configured to measure characteristics of the battery, the characteristics comprising an electrical characteristic and a battery temperature; and
    battery processing logic coupled to the measurement module and configured to:
    cause the measurement module to perform a plurality of measurements of the characteristics of the battery over different time periods;
    generate time series data corresponding to the measurements of the characteristics during each time period;
    determine, during each time period, energy capacity of the battery based on the generated time series data;
    predict a battery life value during each time period based on the determined energy capacity associated with a current and a previous time periods; and
    transmit the battery life value and the unique identifier to a wireless charger.

11. The smart battery of claim 10, further comprising a wireless communication interface configured to transmit the battery life value to the un-manned vehicle.

12. The smart battery of claim 10, wherein the battery processing logic is further configured to store the time series data in the memory.

13. The smart battery of claim 10, wherein the characteristics comprise current values measured during a pre-defined time period.

14. The smart battery of claim 10, wherein in response to determining that the predicted battery life is below a threshold, the battery processing logic is configured to generate a depletion warning message to the un-manned vehicle.

15. The smart battery of claim 10, wherein the un-manned vehicle is an aerial vehicle configured to determine amount of left air time based at least on the predicted battery life.

16. A method for determining energy capacity of a smart battery, the method comprising:
    providing the smart battery configured to be installed on an un-manned vehicle, the smart battery comprising a battery, a memory for storing a unique identifier of the smart battery, a measurement module coupled to the battery, battery processing logic coupled to the measurement module, and a wireless communication interface;
    using the battery processing logic to cause the measurement module to measure characteristics of the battery a plurality of times over different time periods, the characteristics of the battery comprising an electrical characteristic and a battery temperature;
    using the battery processing logic to determine the energy capacity of the battery based at least in part on the characteristics of the battery; and
    using a wireless communication interface to transmit the energy capacity and the unique identifier to a wireless charger.

17. The method of claim 16, wherein the smart battery is communicatively coupled with the wireless charger, the wireless charger comprising:
    a wireless receiver configured to receive energy capacity value from the smart battery;
    a communication port configured to wirelessly connect to a network; and
    a charger processing logic coupled to the communication port, wherein the charger processing logic is configured to transmit the energy capacity and the unique identifier to the network.

18. The method of claim 16, further comprising storing the characteristics in the memory and transmitting the characteristics to the wireless charger.

19. The method of claim 16, wherein the characteristics comprise measured charge current values during a pre-defined time period.

20. The method of claim 16, further comprising in response to determining that the energy capacity is below a threshold, transmitting a depletion warning message to the un-manned vehicle via the wireless communication interface.

21. The method of claim 16, wherein the un-manned vehicle is an aerial vehicle configured to determine an amount of air time left based at least on the energy capacity.

22. The method of claim 16, wherein the measurement module is configured to measure the characteristics continuously during operation of the un-manned vehicle.

* * * * *